US012756592B2

(12) United States Patent
Wan et al.

(10) Patent No.: US 12,756,592 B2
(45) Date of Patent: Oct. 6, 2026

(54) PCIe-BASED DATA TRANSMISSION METHOD AND APPARATUS

(71) Applicant: Yinwang Intelligent Technologies Co., Ltd., Shenzhen (CN)

(72) Inventors: Lei Wan, Beijing (CN); Pengxin Bao, Chengdu (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 430 days.

(21) Appl. No.: 17/870,406

(22) Filed: Jul. 21, 2022

(65) Prior Publication Data

US 2022/0368564 A1 Nov. 17, 2022

Related U.S. Application Data

(63) Continuation of application No. PCT/CN2020/073920, filed on Jan. 22, 2020.

(51) Int. Cl.
*H04L 12/46* (2006.01)
*H04L 45/74* (2022.01)

(52) U.S. Cl.
CPC .......... *H04L 12/4633* (2013.01); *H04L 45/74* (2013.01)

(58) Field of Classification Search
None
See application file for complete search history.

(56) References Cited

U.S. PATENT DOCUMENTS 5,473,691 A 12/1995 Menezes et al.
7,013,354 B1 * 3/2006 Beck .................... G06F 13/387 710/305
8,139,575 B2 3/2012 Biran et al.
9,280,290 B2 * 3/2016 Feehrer ................. G06F 3/0635
9,600,431 B2 3/2017 Iyer et al.
10,176,126 B1 * 1/2019 Banerjee ............. G06F 13/4221
(Continued)

FOREIGN PATENT DOCUMENTS

CN 1608255 A 4/2005
CN 1608256 A 4/2005
(Continued)

OTHER PUBLICATIONS

Wagh Mahesh, “PCIe 3.0/2.1 Protocol Update”, Dec. 31, 2011, pp. 1-35. (Year: 2011).*
(Continued)

*Primary Examiner* — Mariela Vidal Carpio
(74) *Attorney, Agent, or Firm* — Conley Rose, P.C.

(57) ABSTRACT

A Peripheral Component Interconnect Express (PCIe)-based data transmission method includes a first node that encapsulates first data into a first transaction layer packet (TLP) and sends the first TLP to a second node, where a TLP header of the first TLP includes a first field, the first field is used to indicate a data type of the first data, and the data type includes at least one of the following: an image type, a video type, a control type, a security type, and a stream write (SWRITE) type. In embodiments of this application, the first field in the TLP header is used to indicate information required for data transmission, for example, the data type, so that nodes can communicate with each other without using a root complex.

20 Claims, 13 Drawing Sheets

(56) References Cited

U.S. PATENT DOCUMENTS

| | | | | |
|---|---|---|---|---|
| 10,423,552 | B2 | 9/2019 | Harriman | |
| 2003/0123484 | A1 | 7/2003 | Harriman | |
| 2003/0126281 | A1 | 7/2003 | Harriman | |
| 2003/0163303 | A1 | 8/2003 | Du et al. | |
| 2005/0238038 | A1 | 10/2005 | Keller et al. | |
| 2006/0072615 | A1 | 4/2006 | Narad et al. | |
| 2006/0153078 | A1 | 7/2006 | Yasui | |
| 2006/0153226 | A1* | 7/2006 | Gostin | G06F 13/4022 370/465 |
| 2006/0161707 | A1 | 7/2006 | Davies et al. | |
| 2006/0233199 | A1 | 10/2006 | Harriman | |
| 2006/0242354 | A1 | 10/2006 | Johnsen et al. | |
| 2007/0130397 | A1 | 6/2007 | Tsu | |
| 2007/0147426 | A1 | 6/2007 | Sharma et al. | |
| 2007/0168644 | A1 | 7/2007 | Hummel et al. | |
| 2007/0198763 | A1 | 8/2007 | Suzuki et al. | |
| 2008/0016269 | A1* | 1/2008 | Chow | G06F 13/1684 711/103 |
| 2008/0209203 | A1* | 8/2008 | Haneda | G06F 21/85 713/150 |
| 2009/0006711 | A1 | 1/2009 | Biran et al. | |
| 2009/0006932 | A1 | 1/2009 | Biran et al. | |
| 2009/0296740 | A1 | 12/2009 | Wagh et al. | |
| 2010/0329255 | A1 | 12/2010 | Singhal et al. | |
| 2012/0017025 | A1 | 1/2012 | Luk et al. | |
| 2012/0030402 | A1 | 2/2012 | Murakami et al. | |
| 2012/0188882 | A1 | 7/2012 | Wilkinson et al. | |
| 2013/0003540 | A1 | 1/2013 | Teoh et al. | |
| 2013/0111086 | A1* | 5/2013 | Ajanovic | G06F 13/4265 710/305 |
| 2014/0115420 | A1 | 4/2014 | Willey et al. | |
| 2014/0122769 | A1* | 5/2014 | Su | G06F 13/4022 710/314 |
| 2014/0181354 | A1 | 6/2014 | Yi et al. | |
| 2014/0281104 | A1* | 9/2014 | Raskin | G06F 13/4022 710/313 |
| 2014/0298086 | A1 | 10/2014 | Haneda | |
| 2014/0372660 | A1 | 12/2014 | Jones et al. | |
| 2015/0207712 | A1* | 7/2015 | Fang | H04L 43/0852 370/252 |
| 2015/0227312 | A1* | 8/2015 | Feehrer | G06F 3/0635 710/22 |
| 2016/0041936 | A1 | 2/2016 | Lee et al. | |
| 2016/0188517 | A1* | 6/2016 | Naven | H04L 69/22 710/316 |
| 2016/0371221 | A1 | 12/2016 | Rosenberg et al. | |
| 2017/0060422 | A1 | 3/2017 | Sharifie et al. | |
| 2017/0068636 | A1* | 3/2017 | Vishwanathan | G06F 13/4282 |
| 2017/0220494 | A1 | 8/2017 | Shacham et al. | |
| 2018/0095817 | A1 | 4/2018 | Zhang et al. | |
| 2018/0101498 | A1 | 4/2018 | Cosby et al. | |
| 2018/0191629 | A1* | 7/2018 | Biederman | H04L 47/6225 |
| 2018/0307648 | A1* | 10/2018 | Shakamuri | G06F 13/4282 |
| 2018/0341619 | A1* | 11/2018 | Slik | G06F 3/0614 |
| 2019/0037052 | A1 | 1/2019 | Deshpande | |
| 2019/0108156 | A1 | 4/2019 | Lee et al. | |
| 2019/0132198 | A1* | 5/2019 | Li | G06F 9/30134 |
| 2019/0278477 | A1* | 9/2019 | Benisty | G06F 3/0655 |
| 2019/0278485 | A1 | 9/2019 | Benisty | |
| 2019/0286604 | A1* | 9/2019 | Minato | G06F 3/0679 |
| 2019/0324930 | A1 | 10/2019 | Liu et al. | |
| 2019/0391936 | A1* | 12/2019 | Stalley | H04L 67/568 |
| 2020/0012555 | A1* | 1/2020 | Das Sharma | G06F 11/1402 |
| 2020/0021540 | A1* | 1/2020 | Marolia | H04L 49/3009 |
| 2020/0026599 | A1 | 1/2020 | Chen et al. | |
| 2020/0044895 | A1* | 2/2020 | Mittal | G06F 13/4282 |
| 2020/0089645 | A1 | 3/2020 | Benjamini et al. | |
| 2020/0133634 | A1* | 4/2020 | Ukai | G06F 13/4291 |
| 2020/0226091 | A1* | 7/2020 | Harriman | G06F 13/4282 |
| 2021/0026559 | A1* | 1/2021 | Richter | G06F 3/0611 |
| 2021/0042255 | A1* | 2/2021 | Colenbrander | G06F 13/122 |
| 2022/0206969 | A1* | 6/2022 | Que | G06F 13/28 |
| 2022/0358070 | A1* | 11/2022 | Wan | G06F 13/4022 |
| 2022/0358074 | A1* | 11/2022 | Wan | G06F 13/4278 |
| 2022/0358075 | A1* | 11/2022 | Wan | G06F 13/4265 |
| 2022/0365895 | A1* | 11/2022 | Wan | G06F 13/4022 |
| 2022/0368781 | A1* | 11/2022 | Wan | G06F 13/4221 |
| 2022/0374385 | A1* | 11/2022 | Wan | G06F 13/4221 |

FOREIGN PATENT DOCUMENTS

| | | | |
|---|---|---|---|
| CN | 1953461 | A | 4/2007 |
| CN | 101594306 | A | 12/2009 |
| CN | 101681325 | A | 3/2010 |
| CN | 102821082 | A | 12/2012 |
| CN | 103003808 | A | 3/2013 |
| CN | 103023824 | A | 4/2013 |
| CN | 103117929 | A | 5/2013 |
| CN | 103490852 | A | 1/2014 |
| CN | 103532807 | A | 1/2014 |
| CN | 103701680 | A | 4/2014 |
| CN | 105185414 | A | 12/2015 |
| CN | 105205021 | A | 12/2015 |
| CN | 105335227 | A | 2/2016 |
| CN | 105653481 | A | 6/2016 |
| CN | 107656884 | A | 2/2018 |
| CN | 107771325 | A | 3/2018 |
| CN | 110389711 | A | 10/2019 |
| CN | 113498600 | A | 10/2021 |
| EP | 3489836 | A1 | 5/2019 |
| EP | 3311295 | B1 | 12/2019 |
| WO | 2015016882 | A1 | 2/2015 |

OTHER PUBLICATIONS

Wagh Mahesh: "PCIe 3.0/2.1 Protocol Update," Dec. 31, 2011, pp. 1-35, XP055980142, 35 pages.

PCI Express Base Specification Revision 5.0, Version 1.0, May 22, 2019, 1299 pages.

Jason Lawley, "Understanding Performance of PCI Express Systems", White Paper: UltraScale and Virtex-7 FPGAs, WP350 (v1.2) Oct. 28, 2014, 16 pages.

Qiu Xuehong et al., "Microcomputer Principles and Interface Technology (Third Edition)", Xidian University Press, ISBN978-7-5606-3834-8, Jun. 2016, with an English abstract, 10 pages.

Shi Dong et al., "Design of High Speed Image Transmission System Based on Double DMA Buffer", Chinese Journal of Electron Devices, vol. 41, No. 6, Dec. 2018, with an English machine translation, 12 pages.

* cited by examiner

| | | | |
|---|---|---|---|
| TLP prefix (H bytes) | TLP header (12/16 bytes) | Data payload (0 bytes to 4K bytes) | TLP digest (4 bytes) |

PCIe-BASED DATA TRANSMISSION METHOD AND APPARATUS

CROSS-REFERENCE TO RELATED APPLICATIONS

This is a continuation of International Patent Application No. PCT/CN2020/073920 filed on Jan. 22, 2020, the disclosure of which is hereby incorporated by reference in its entirety.

TECHNICAL FIELD

This disclosure relates to the field of communications technologies, and in particular, to a Peripheral Component Interconnect Express (PCIe)-based data transmission method and apparatus.

BACKGROUND

PCIe is a high-speed and short-range communications interface, can quickly read data from and write data into memory, supports high-broadband communication, and is widely applied to devices such as a computer and a test instrument.

Main components of a PCIe system include a root complex (root), a switching node (switch), and an endpoint. The root is configured to manage all buses and all nodes in the PCIe system, and is a bridge for communication between nodes in the PCIe system. The node is an endpoint or a switching node. The switching node may be connected to the root complex, another switching node, and the endpoint, and is a data forwarding node in the PCIe system. The endpoint is an end device, for example, a peripheral device (peripheral), and is configured to receive or send data. In the PCIe system, only the root and a node (for example, an endpoint or a switching node) have permission to read configuration space of the node. The configuration space is used to store information such as a function (for example, a data type supported by the node), an address, or an identity (ID) of the node. Another node in the PCIe system has no permission to read the configuration space of the node. This means that in the PCIe system, only the root knows information such as a function and an address of each node. Therefore, communication cannot be directly performed between endpoints, between switching nodes, or between an endpoint and a switching node, but needs to be performed by using the root. In the PCIe system, communication between nodes needs to be performed by using the root. Consequently, complexity of communication between the nodes is greatly increased.

SUMMARY

Embodiments of this disclosure provide a PCIe-based data transmission method and apparatus, so that communication between nodes in a PCIe system is performed without using a root, to reduce complexity of communication between the nodes.

According to a first aspect, an embodiment of this disclosure provides a PCIe-based data transmission method, including that a first node encapsulates first data into a first transaction layer packet (TLP), where a TLP header of the first TLP includes a first field, and the first field is used to indicate a data type of the first data, and the first node sends the first TLP to a second node.

In a possible design, the data type includes at least one of the following: an image type, a video type, a control type, a security type, and a stream write (SWRITE) type.

In a possible design, the first node may be an endpoint or a switching node, and the second node may be an endpoint or a switching node.

In this embodiment of this disclosure, the first field in the TLP header is used to indicate information, for example, the data type, required for transmitting the data. The first node may be an endpoint or a switching node, and the second node may be an endpoint or a switching node. In this way, communication between endpoints, communication between switching nodes, and communication between an endpoint and a switching node in a PCIe system may be performed without using a root, to reduce complexity of communication between nodes in the PCIe system.

In a possible design, the first field may be further used to indicate at least one piece of parameter information corresponding to the data type. In the design, the first field included in the TLP header is used to indicate the at least one piece of parameter information corresponding to the data type. In this way, communication between nodes may be performed without using the root.

In a possible design, the first field is a type field in the TLP header of the first TLP. In the design, the type field in the TLP header is used to indicate the information required for transmitting the data. In this way, a TLP structure does not need to be changed, and communication between nodes may be performed without using the root.

In a possible design, a value of the first field is a reserved value. In the design, the value of the first field is a reserved value. In this way, the TLP can be compatible with an original data transmission method and the data transmission method provided in this embodiment of this disclosure, and the TLP structure does not need to be changed.

In a possible design, the TLP header of the first TLP further includes a second field, the second field may be used to indicate identity information of a third node, and the third node is a destination device of the first TLP. In the design, the second field in the TLP header is used to indicate the identity information of the destination device. In this way, after obtaining the identity information of the destination device through parsing, an intermediate node (for example, a switching node in a connection relationship with the first node) may determine a routing path based on the identity information of the destination device, and send the first data to the destination device based on the routing path, so that the root may not be used.

In a possible design, when the first field is used to indicate only the data type of the first data, the second field is further used to indicate the at least one piece of parameter information corresponding to the data type. In the design, when the first field is used to indicate only the data type, the second field may be used to indicate the at least one piece of parameter information corresponding to the data type, so that communication between endpoints is performed without using the root.

In a possible design, the second field is a byte 4 to a byte 15 or a byte 4 to a byte 11 in the TLP header of the first TLP. Content indicated by the byte 4 to the byte 15 or the byte 4 to the byte 11 in the TLP header varies with the type field. When the first field indicates the data type, the byte 4 to the byte 15 or the byte 4 to the byte 11 may be used to indicate the identity information of the destination device or to indicate the identity information of the destination device and the at least one piece of parameter information corresponding to the data type.

According to a second aspect, an embodiment of this disclosure provides a PCIe-based data transmission method, including that a second node receives a first TLP from a first node, where the first TLP includes first data, and the second node sends a second TLP to a third node, where the second TLP includes the first data, a TLP header of the TLP includes a first field, the first field is used to indicate a data type of the first data, and the TLP includes the first TLP and/or the second TLP.

In a possible design, the data type includes at least one of the following: an image type, a video type, a control type, a security type, and a SWRITE type.

In a possible design, that the second TLP includes the first data may be understood as that content of data included in the second TLP is the same as that of data included in the first TLP.

In a possible design, the first node may be an endpoint or a switching node, and the second node may be a switching node.

In this embodiment of this disclosure, the first field in the TLP header is used to indicate information, for example, the data type, required for transmitting the data. The first node may be an endpoint or a switching node, the second node may be an endpoint or a switching node, and the third node may be an endpoint or a switching node. In this way, communication between endpoints, communication between switching nodes, and communication between an endpoint and a switching node may be performed without using a root, to reduce complexity of communication between nodes in a PCIe system.

In a possible design, the first field is further used to indicate at least one piece of parameter information corresponding to the data type. In the design, the first field in the TLP header may be used to indicate the information, for example, the at least one piece of parameter information corresponding to the data type, required for transmitting the data, so that communication between nodes may be performed without using the root.

In a possible design, the first field is a type field in the TLP header. In the design, the type field in the TLP header is used to indicate the information required for transmitting the data. In this way, a TLP structure does not need to be changed, and communication between nodes may be performed without using the root.

In a possible design, a value of the first field is a reserved value. In the design, the value of the first field is a reserved value. In this way, the TLP can be compatible with an original data transmission method and the data transmission method provided in this embodiment of this disclosure, and the TLP structure does not need to be changed.

In a possible design, the TLP header further includes a second field, and the second field is used to indicate identity information of the third node. In the design, the second field in the TLP header is used to indicate the identity information of the destination device. In this way, after obtaining the identity information of the destination device through parsing, an intermediate node (for example, a switching node in a connection relationship with the first node) may determine a routing path based on the identity information of the destination device, and send the first data to the destination device based on the routing path, so that the root may not be used.

In a possible design, when the first field is used to indicate only the data type of the first data, the second field is further used to indicate the at least one piece of parameter information corresponding to the data type. In the design, when the first field is used to indicate only the data type, the second field may be used to indicate the at least one piece of parameter information corresponding to the data type, so that communication between endpoints is performed without using the root.

In a possible design, the second field is a byte 4 to a byte 15 or a byte 4 to a byte 11 in the TLP header of the TLP. In the design, content indicated by the byte 4 to the byte 15 or the byte 4 to the byte 11 in the TLP header varies with the type field. When the first field indicates the data type, the byte 4 to the byte 15 or the byte 4 to the byte 11 may be used to indicate the identity information of the destination device or to indicate the identity information of the destination device and the at least one piece of parameter information corresponding to the data type.

In a possible design, that the second node sends a second TLP to a third node includes that the second node determines a routing path based on the identity information of the third node, and the second node sends the second TLP to the third node based on the routing path. In the design, a switching node determines a routing path based on the identity information of a target device (namely, the third node), and then sends the first data to the third node based on the routing path. In this way, the root does not need to be used, to reduce complexity of communication between the nodes in the PCIe system.

According to a third aspect, an embodiment of this disclosure provides a PCIe-based data transmission method, including that a third node receives a second TLP from a second node, where the second TLP includes first data, a TLP header of the second TLP includes a first field, and the first field is used to indicate a data type of the first data, and obtains the first data based on the first field.

In a possible design, the data type includes at least one of the following: an image type, a video type, a control type, a security type, and a SWRITE type.

In a possible design, the second node may be an endpoint or a switching node, and the third node may be an endpoint or a switching node.

In this embodiment of this disclosure, the first field in the TLP header is used to indicate information, for example, the data type, required for transmitting the data. The third node may be an endpoint or a switching node, and the second node may be an endpoint or a switching node. In this way, communication between endpoints, communication between switching nodes, and communication between an endpoint and a switching node may be performed without using a root, to reduce complexity of communication between nodes in a PCIe system.

In a possible design, the first field is further used to indicate at least one piece of parameter information corresponding to the data type. In the design, the first field in the TLP header may be used to indicate the information, for example, the at least one piece of parameter information corresponding to the data type, required for transmitting the data, so that communication between nodes may be performed without using the root.

In a possible design, the first field is a type field in the second TLP header. In the design, the type field in the TLP header is used to indicate the information required for transmitting the data. In this way, a TLP structure does not need to be changed, and communication between nodes may be performed without using the root.

In a possible design, a value of the first field is a reserved value. In the design, the value of the first field is a reserved value. In this way, the TLP can be compatible with an original data transmission method and the data transmission method provided in this embodiment of this disclosure, and the TLP structure does not need to be changed.

In a possible design, the second TLP header further includes a second field, and the second field is used to indicate identity information of the third node. In the design, when the first field is used to indicate only the data type, the second field may be used to indicate the at least one piece of parameter information corresponding to the data type, so that communication between nodes is performed without using the root.

In a possible design, when the first field is used to indicate only the data type of the first data, the second field is further used to indicate the at least one piece of parameter information corresponding to the data type. In the design, when the first field is used to indicate only the data type, the second field may be used to indicate the at least one piece of parameter information corresponding to the data type, so that communication between nodes is performed without using the root.

In a possible design, the second field is a byte 4 to a byte 15 or a byte 4 to a byte 11 in the second TLP header. In the design, content indicated by the byte 4 to the byte 15 or the byte 4 to the byte 11 in the TLP header varies with the type field. When the first field indicates the data type, the byte 4 to the byte 15 or the byte 4 to the byte 11 may be used to indicate the identity information of the destination device or to indicate the identity information of the destination device and the at least one piece of parameter information corresponding to the data type.

According to a fourth aspect, an embodiment of this disclosure provides a PCIe-based data transmission apparatus. The apparatus may be a communications device or a chip or a chipset in a communications device. The communications device may be any one of a first node, a second node, or a third node. In other words, the communications device may be an endpoint or a switching node. The apparatus may include a processing unit and a transceiver unit. When the apparatus is a communications device, the processing unit may be a processor, and the transceiver unit may be a transceiver. The apparatus may further include a storage module, and the storage module may be a memory. The storage module is configured to store instructions. The processing unit executes the instructions stored in the storage module, so that the first node performs the corresponding function in the first aspect. Alternatively, the processing unit executes the instructions stored in the storage module, so that the second node performs the corresponding function in the second aspect. Alternatively, the processing unit executes the instructions stored in the storage module, so that the third node performs the corresponding function in the third aspect. When the apparatus is a chip or a chipset in a communications device, the processing unit may be a processor, and the transceiver unit may be an input/output interface, a pin, a circuit, or the like. The processing unit executes the instructions stored in the storage module, so that the first node performs the corresponding function in the first aspect. Alternatively, the processing unit executes the instructions stored in the storage module, so that the second node performs the corresponding function in the second aspect. Alternatively, the processing unit executes the instructions stored in the storage module, so that the third node performs the corresponding function in the third aspect. The storage module may be a storage module (for example, a register or a cache) in the chip or the chip set, or may be a storage module (for example, a read-only memory (ROM) or a random-access memory) that is located in the network device and that is located outside the chip or the chipset.

According to a fifth aspect, an embodiment of this disclosure provides a PCIe-based data transmission apparatus. The apparatus includes a processor, and may further include a communications interface and/or a memory. The communications interface is configured to transmit information, a message, and/or data between the apparatus and another apparatus. The memory is configured to store computer-executable instructions. When the apparatus runs, the processor executes the computer-executable instructions stored in the memory, so that the apparatus performs the data transmission method in any one of the first aspect or the designs of the first aspect, any one of the second aspect or the designs of the second aspect, or any one of the third aspect or the designs of the third aspect.

According to a sixth aspect, an embodiment of this disclosure further provides a computer-readable storage medium. The computer-readable storage medium is configured to store computer instructions. When the computer instructions are run on a computer, the computer is enabled to perform the data transmission method in any one of the first aspect or the possible designs of the first aspect, any one of the second aspect or the possible designs of the second aspect, or any one of the third aspect or the possible designs of the third aspect.

According to a seventh aspect, this disclosure further provides a computer program product that includes instructions. The computer program product is configured to store computer instructions. When the computer instructions are run on a computer, the computer is enabled to perform the data transmission method in any one of the first aspect or the possible designs of the first aspect, any one of the second aspect or the possible designs of the second aspect, or any one of the third aspect or the possible designs of the third aspect.

According to an eighth aspect, this disclosure further provides a PCIe system. The system includes a first node, a second node, and a third node. For example, the first node is an endpoint, the second node is a switching node, and the third node is an endpoint. The first node may perform the corresponding function in the first aspect, the second node may perform the corresponding function in the second aspect, and the third node may perform the corresponding function in the third aspect.

According to a ninth aspect, an embodiment of this disclosure provides a chip. The chip includes at least one processor and a communications interface. The processor is coupled to a memory, and is configured to read a computer program stored in the memory, to perform the data transmission method in any one of the first aspect or the designs of the first aspect, any one of the second aspect or the designs of the second aspect, or any one of the third aspect or the designs of the third aspect of the embodiments of this disclosure.

According to a tenth aspect, an embodiment of this disclosure provides a chip, including a communications interface and at least one processor. The processor runs to perform the data transmission method in any one of the first aspect or the possible designs of the first aspect, any one of the second aspect or the possible designs of the second aspect, or any one of the third aspect or the possible designs of the third aspect of the embodiments of this disclosure.

DESCRIPTION OF EMBODIMENTS

To make the objectives, technical solutions, and advantages of embodiments of this disclosure clearer, the following further describes embodiments of this disclosure in detail with reference to the accompanying drawings.

It should be noted that in the embodiments of this disclosure, "a plurality of" means two or more. In view of this, in the embodiments of this disclosure, "a plurality of" may be understood as "at least two". "At least one" may be understood as one or more, for example, one, two, or more. For example, "including at least one" means "including one, two, or more", and an included object is not limited. For example, "including at least one of A, B, and C" may mean "including A, B, C, A and B, A and C, B and C, or A, B, and C". The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects, unless otherwise specified.

Unless otherwise specified, ordinal numbers such as "first" and "second" in the embodiments of this disclosure are intended to distinguish between a plurality of objects, and not intended to limit an order, a time sequence, priorities, or importance of the plurality of objects.

For ease of understanding by a skilled person, a PCIe system in the embodiments of this disclosure is first described below with reference to the accompanying drawings.

Figure 1:
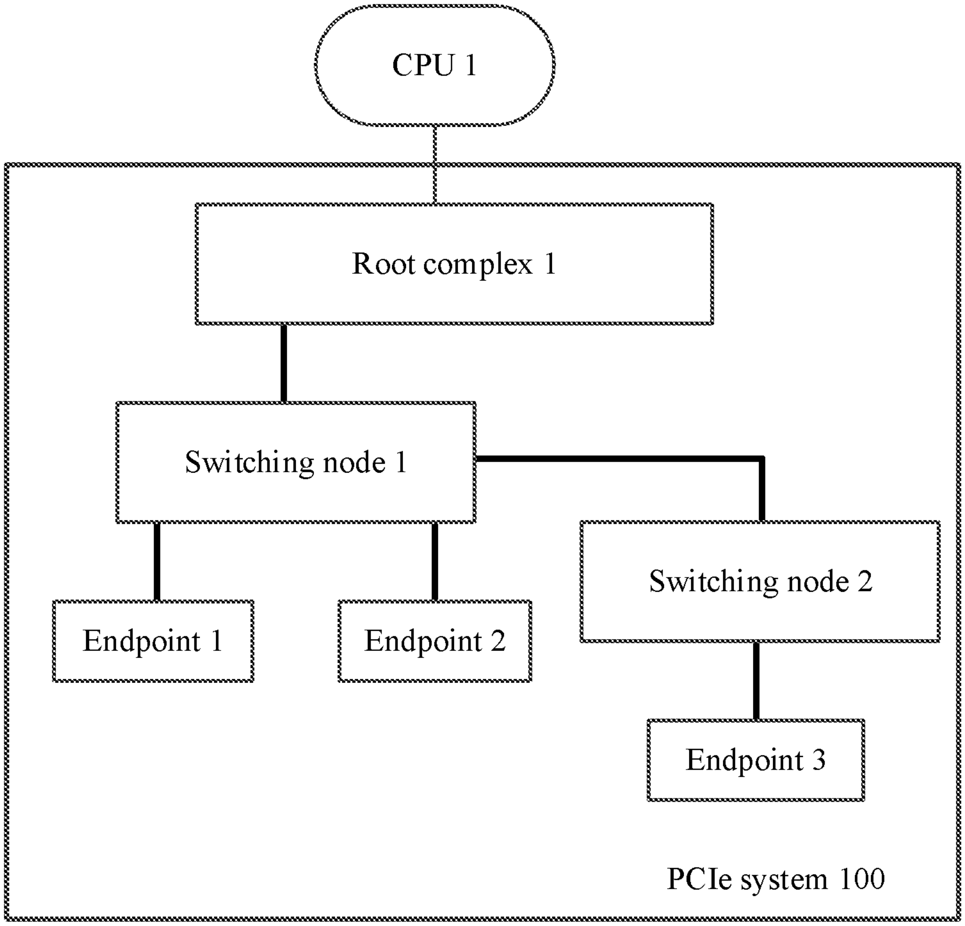
FIG. 1 is a schematic diagram of an architecture of a PCIe system according to an embodiment of this disclosure.

PCIe is a high-speed and short-range communications interface, and is widely applied to devices such as a computer and a test instrument. PCIe can quickly read data from and write data into memory, and supports high-broadband communication. Some automobile enterprises lengthen a transmission distance of PCIe, and may use PCIe as a communications interface for a large amount of data in an in-vehicle network. FIG. 1 is a schematic diagram of a structure of a PCIe system according to an embodiment of this disclosure. As shown in FIG. 1, the PCIe system may include a root complex (shown as a root complex 1 in FIG. 1), at least one switching node (FIG. 1 includes a switching node 1 and a switching node 2), and at least one endpoint (FIG. 1 includes an endpoint 1, an endpoint 2, and an endpoint 3).

The root complex 1 is responsible for managing all buses (shown by bold black connecting lines in FIG. 1), switching nodes, and endpoints in the PCIe system 100, is a bridge for communication between nodes in the PCIe system 100, and is also a bridge for communication between each node in the PCIe system 100 and a central processing unit (CPU) 1. The switching node serves as a bridge, is connected to one or more of the root complex, another switching node, and the endpoint, and is a data forwarding node. For example, the switching node 1 is connected to the root complex 1, the switching node 2, the endpoint 1, and the endpoint 2. The endpoint is an end device, for example, a peripheral device, and is responsible for sending or receiving data.

It should be noted that an interface between the CPU 1 and the root complex 1 is not PCIe, and does not belong to the PCIe system 100. The CPU 1 may establish a connection relationship with an entity (for example, a computer device or a vehicle) in which the PCIe system 100 is located, or may be located in a same entity as the PCIe system 100, is configured to receive data sent by each node in the PCIe system 100, and may further process received data, for example, perform format conversion and image rendering.

Figures 2, 3:
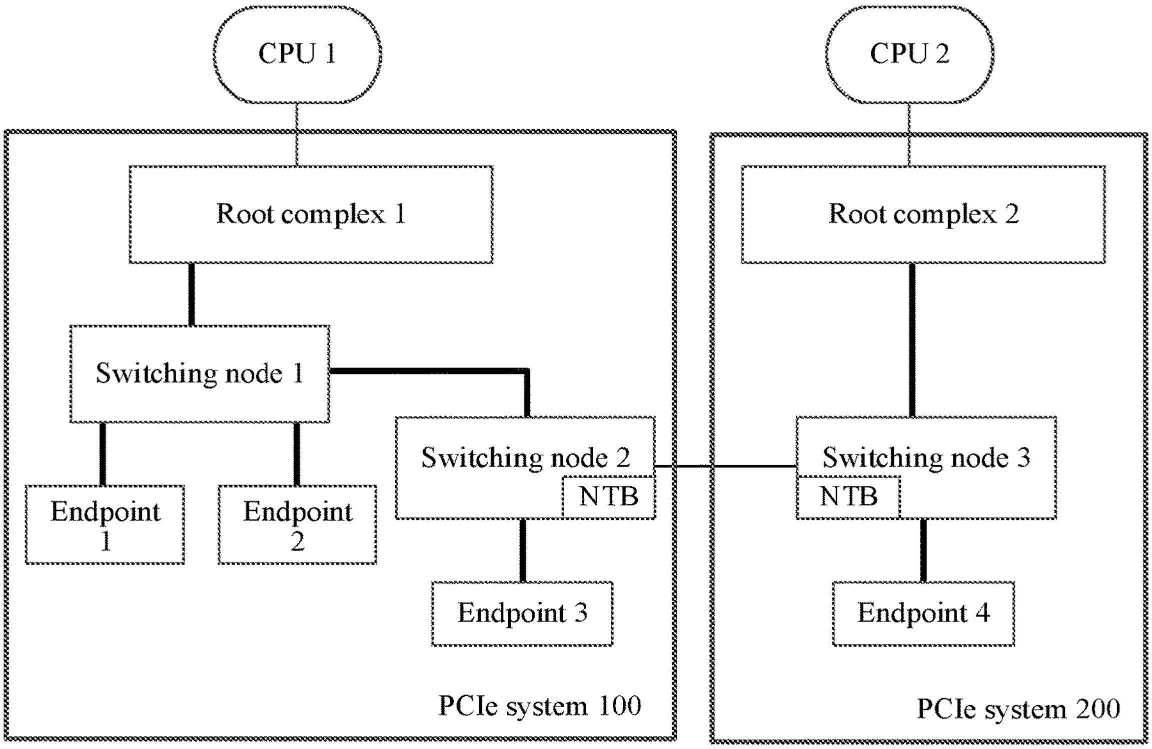
FIG. 2 is a schematic diagram of an architecture of another PCIe system according to an embodiment of this disclosure.
FIG. 3 is a schematic diagram of a structure of a TLP according to an embodiment of this disclosure.

FIG. 2 is a schematic diagram of structures of two PCIe systems. In the two PCIe systems, one PCIe system is, for example, the PCIe system 100 shown in FIG. 1, and the other PCIe system is a PCIe system 200. The PCIe system 200 may include a root complex 2, a switching node 3, and an endpoint 4. Communication between each node in the PCIe system 200 and a CPU 2 needs to be performed by using the root complex 2.

It should be noted that an interface between the CPU 2 and the root complex 2 is not PCIe, and does not belong to the PCIe system 200. The CPU 2 may establish a connection relationship with an entity (for example, a computer device or a vehicle) in which the PCIe system 200 is located, or may be located in a same entity as the PCIe system 200, is configured to receive data sent by each node in the PCIe system 200, and may further process received data, for example, perform format conversion and image rendering.

A node (an endpoint or a switching node) in a PCIe system is independently managed by a respective root complex, and an address, an ID, and/or the like of the node in the PCIe system are/is independently allocated by the root complex in the PCIe system. This means that an address and/or an ID allocated by a root complex can be unique only in a PCIe system in which the root complex is located.

However, in different PCIe systems, addresses and/or IDs of nodes may overlap. Therefore, there may be an address conflict and/or an ID conflict in different PCIe systems. For example, a root complex 1 in the PCIe system 100 allocates an address 1 to an endpoint 1. The address 1 is unique in the PCIe system 100 and the PCIe system 200. In this case, the root complex 2 in the PCIe system 200 may allocate the address 1 to the endpoint 4. In this way, the endpoint 1 and the endpoint 4 have the same address, and consequently there is an address conflict between the endpoint 1 and the endpoint 2. To implement communication between two PCIe systems, bridging translation needs to be performed between the two PCIe systems, to perform address or ID translation. For example, a non-transparent bridge (NTB) may be deployed between the PCIe system 100 and the PCIe system 200. The NTB can perform address conversion or translation or perform ID conversion or translation, to implement communication between the two PCIe systems.

In a PCIe system, communication cannot be directly performed between nodes, and needs to be performed by using a root complex. This is because a node in the PCIe system is independently managed by a respective root complex, only the root complex and the node have permission to read configuration space of the node, and another node has no permission to read the configuration space of the node. The configuration space of the node is used to store information such as a function, an address, or an ID of the node, and the function of the node includes, for example, a data type or a data format supported by the node. In the PCIe system, a node does not know a data type, a format, or the like supported by another node. Therefore, in the PCIe system, communication cannot be directly performed between endpoints, between switching nodes, or between an endpoint and a switching node without using the root complex.

In the PCIe system, data is transmitted between nodes by using a PCIe interface. In a PCIe protocol, a data packet used for data transmission is referred to as a TLP. FIG. 3 is a schematic diagram of a structure of a TLP according to an embodiment of this disclosure. As shown in FIG. 3, the TLP mainly includes one or more optional TLP prefix, a TLP header, a data payload, and an optional TLP digest. A length of the TLP prefix is H bytes, and is used to transfer a message between two ends of PCIe, or is used to transfer a message between a sending device and a receiving device, where H is an integer greater than or equal to 0. A length of the TLP header may be 12 bytes or 16 bytes, and is used to indicate information such as a PCIe service type and an address. A length of the data payload may be from 0 bytes to 4K bytes, and is used to carry data. A length of the TLP digest may be 4 bytes, and whether a TLP needs a TLP digest is determined based on a TLP digest (TD) indication (indicates presence of TD) field in a TLP header. For example, if the receiving device supports a check function of an end-to-end cyclic redundancy check (ECRC), the TLP digest is used to carry the ECRC.

Figure 4:
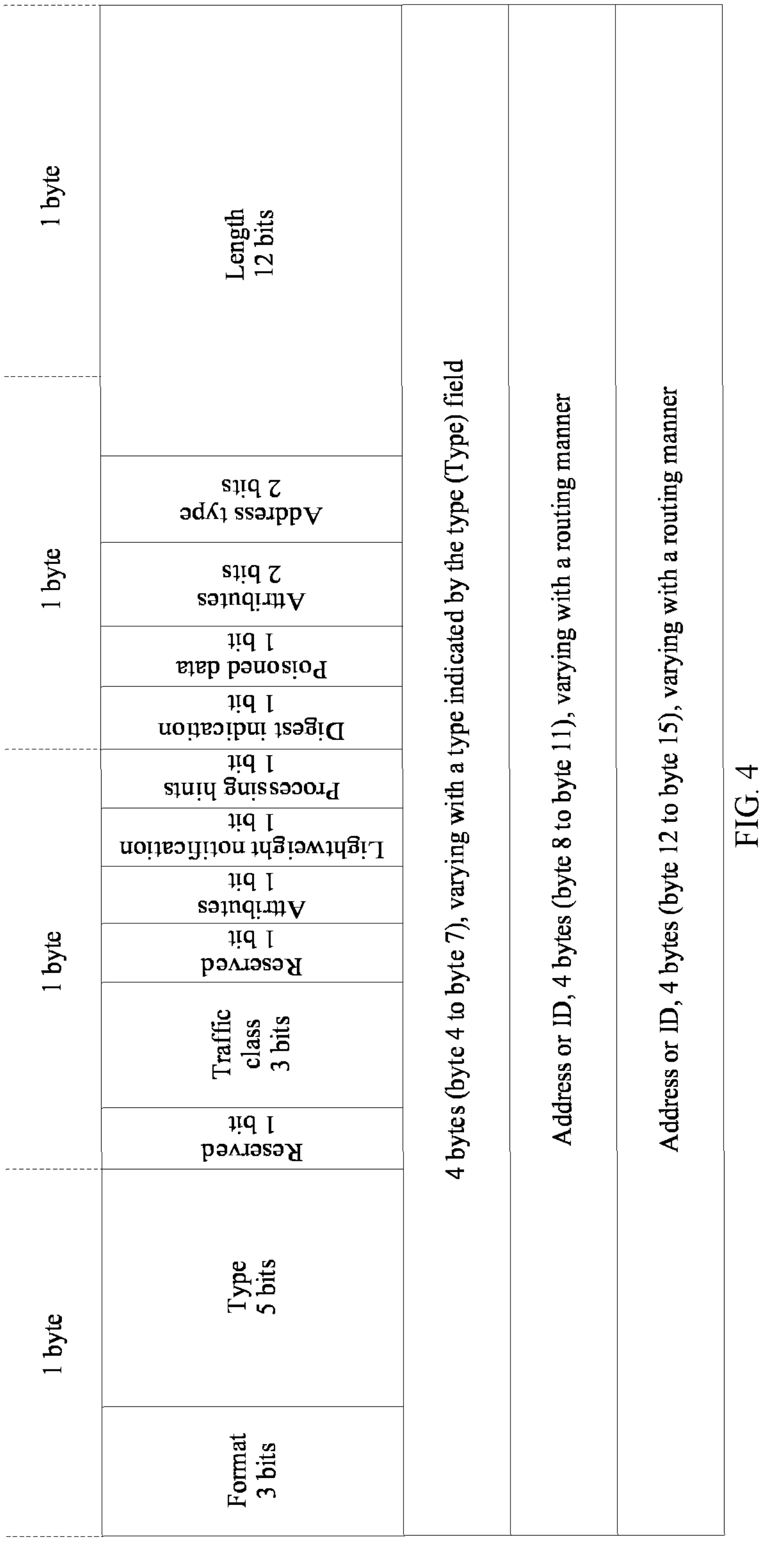
FIG. 4 is a schematic diagram of a structure of a TLP header according to an embodiment of this disclosure.

FIG. 4 is a schematic diagram of a structure of a TLP header according to an embodiment of this disclosure. In the figure, an example in which a length of the TLP header is 16 bytes is used. As shown in FIG. 4, the TLP header includes the following fields.

(1) Format (Fmt) field: A length of the field may be 3 bits, and is used to indicate the length of the TLP header and indicate whether a TLP includes a data payload. The length of the TLP header is 12 bytes or 16 bytes, and whether the TLP includes the data payload includes two cases. Therefore, the Fmt field may indicate four types of information: the length of the TLP header is 12 bytes and the TLP includes the data payload, the length of the TLP header is 12 bytes and the TLP includes no data payload, the length of the TLP header is 16 bytes and the TLP includes the data payload, and the length of the TLP header is 16 bytes and the TLP includes no data payload. In addition, the Fmt field may further indicate a TLP prefix. The Fmt field includes 3 bits and eight status values in total. Five of the eight status values may be used to indicate the foregoing five types of information, and the remaining three status values are reserved. For example, five status values 000, 001, 010, 011, and 100 may be used to indicate the five types of information, and the remaining three status values 101, 110, and 111 are reserved.

(2) Type field: A length of the type field may be 5 bits, and is used to indicate information such as a PCIe service type, an address, and an ID. There are six PCIe service types: memory read/write, input/output (I/O) read/write, configuration read/write, message request, completion, and an atomic operation. The type field includes 5 bits and 32 status values in total. For example, in the PCI Express Base Specification Revision 5.0 Version 1.0, 19 of status values are used to indicate the PCIe service type, and the remaining 13 status values are reserved. For example, 00000, 00001, 00010, 00100, 00101, 11011, 10000-10111, 01010, 01011, 01100, 01101, and 01110 may be used to indicate a TLP service type, and the remaining 13 status values 00011, 00110, 00111, 01000, 01001, 01111, 11000-11010, and 11100-11111 are reserved.

(3) T9/T8: This is a reserved bit.

(4) Traffic class (TC) field: The field is used to indicate a traffic scheduling priority. The TC field includes 3 bits and eight status values in total, and corresponds to eight classes, namely, 0-7. It is considered by default that the TC field is 0 (a corresponding status value is 000). A larger number indicates a higher priority.

(5) Attributes (Attr) field: The field is used to indicate a TLP attribute. For example, the TLP attribute is an ordering attribute or a hardware coherency management attribute.

(6) Lightweight notification (LN) field: The field is a lightweight notification, and is a simple read/write manner defined by PCIe.

(7) TLP processing hints (TH) field: The field is used to indicate whether there is a processing hint at a tail of the TLP header.

(8) TD field: The field is used to indicate whether a TLP tail includes a TLP digest, an ECRC, or the like.

(9) Poisoned data (EP): This is used to indicate whether data carried in a data payload field in the current TLP is poisoned data.

(10) Address type (AT): This is used to indicate whether an address carried in the current TLP needs to be translated.

(11) Length: This is used to indicate a length of the data payload field in the current TLP, for example, 4 bytes are used as a minimum unit.

(12) Byte 4 to byte 7: The bytes are defined based on a service type, in other words, the byte 4 to the byte 7 may indicate content corresponding to the PCIe service type indicated in the type field.

(13) Byte 8 to byte 15: Padding with different addresses or IDs may be performed based on different routing manners. The byte 8 to a byte 11 may be padded with an address of a destination node or an ID of a destination node, and a byte 12 to the byte 15 may be padded with an address of a source node or an ID of a source node. Alternatively, the byte 8 to a byte 11 may be padded with an address of a source node or an ID of a source node, and a byte 12 to the byte 15 may be padded with an address of a destination node or an ID of a destination node.

It should be noted that a structure type of a 12-byte TLP header is similar to that of a 16-byte TLP header. A difference lies in that in the 16-byte TLP header, a byte 4 to a byte 7 are defined based on a service type, and a byte 8 to a byte 15 are padded with address information, while in the 12-byte TLP header, a byte 4 to a byte 7 are defined based on a service type, and a byte 8 to a byte 11 are padded with address information.

It should be noted that a "reserved value" in the embodiments of this disclosure may be a status value that is not used and that is in each field in the TLP, for example, the 13 status values 00011, 00110, 00111, 01000, 01001, 01111, 11000-11010, and 11100-11111 in the type field. The "reserved value" may also be referred to as a "reserved status value". A "used status value" in the embodiments of this disclosure may be a used status value in each field in the TLP, for example, the 19 status values 00000, 00001, 00010, 00100, 00101, 11011, 10000-10111, 01010, 01011, 01100, 01101, and 01110 in the type field.

It may be understood that in a subsequent evolved version, the "reserved value" in the embodiments of this disclosure may be a status value that is not used and that is in the TLP in the corresponding evolved version. This is not limited in the embodiments of this disclosure.

In a working mechanism in which communication between nodes in the PCIe system needs to be performed by using the root, complexity of communication between the nodes in the PCIe system is greatly increased. As shown in FIG. 1 or FIG. 2, although the endpoint 1 and the endpoint 2 are connected to the switching node 1, communication cannot be directly performed between the endpoint 1 and the endpoint 2 by using the switching node 1, and the endpoint 1 needs to first communicate with the root complex 1 to find the endpoint 2 by using the root complex 1, or the endpoint 2 needs to first communicate with the root complex 1 to find the endpoint 1 by using the root complex 1. For example, the endpoint 1 sends data to the endpoint 2. A specific process may be as follows. The endpoint 1 sends the data to the switching node 1, the switching node 1 sends the data to the root complex 1, and the root complex 1 determines, based on a function of each endpoint (for example, the endpoint 2 or the endpoint 3), that a data receiver is the endpoint 2. For example, the data is image data, or a type of the data is an image type. The root complex 1 determines, based on the type of the data, that the data needs to be sent to an endpoint with a display or play function. For example, the root complex 1 determines that the endpoint 2 has a display function, and therefore the root complex 1 may send the data to the switching node 1, and the switching node 1 then sends the data to the endpoint 2.

In view of this, the embodiments of this disclosure provide a PCIe-based data transmission method and apparatus, so that communication between nodes in a PCIe system is performed without using a root complex, to reduce complexity of communication between the nodes in the PCIe system.

The method and the apparatus provided in the embodiments of this disclosure have a similar principle for resolving a problem, and therefore mutual reference may be made between implementation of the apparatus and the method. No repeated description is provided. The method provided in the embodiments of this disclosure may be applied to an in-vehicle network, in particular, an in-vehicle network of a self-driving vehicle, and certainly may also be applied to a PCIe system of another device.

Figure 5:
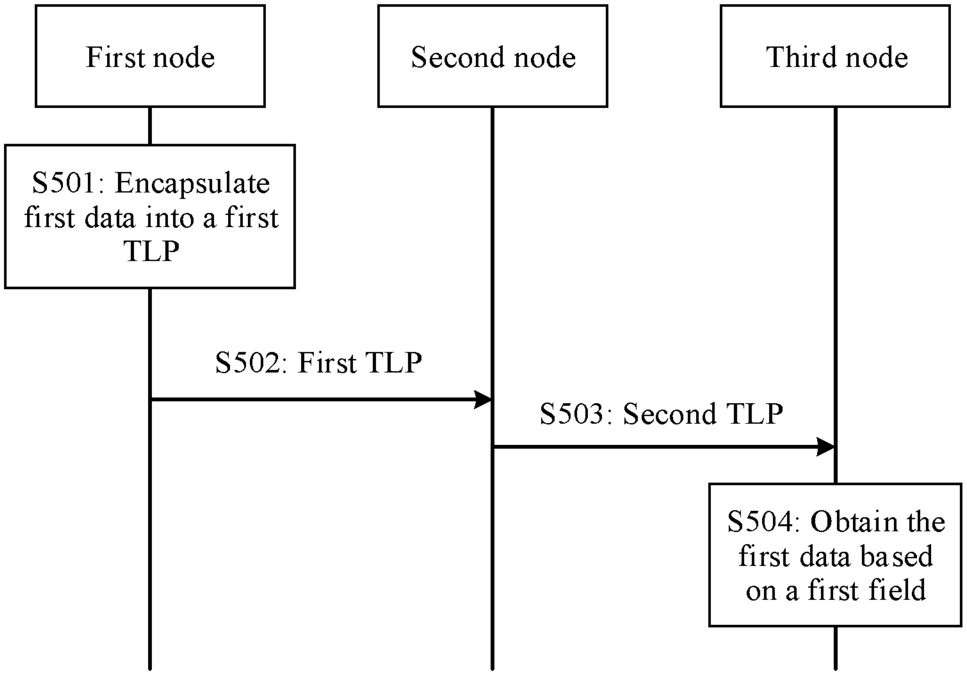
FIG. 5 is a schematic flowchart of a data transmission method according to an embodiment of this disclosure.

FIG. 5 is a flowchart of a PCIe-based data transmission method according to an embodiment of this disclosure. The method may be applied to a PCIe system. For example, the method may be applied to the PCIe system 100 shown in FIG. 1 or the PCIe system 200 shown in FIG. 2. The data transmission method provided in this embodiment of this disclosure is described below by using an example in which the method is applied to the PCIe system 100. As shown in FIG. 5, a procedure of the method includes the following steps.

S501: A first node encapsulates first data into a first TLP, where a TLP header of the first TLP includes a first field, and the first field is used to indicate a data type of the first data.

Figure 6:
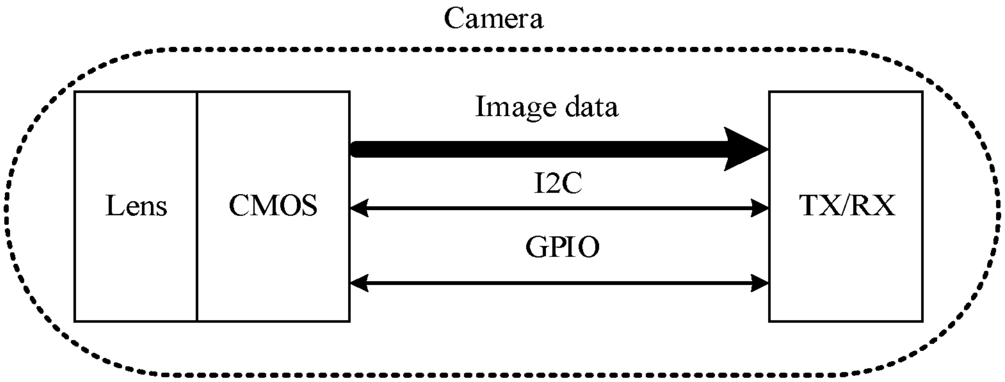
FIG. 6 is a schematic diagram of a structure of a camera according to an embodiment of this disclosure.

The first node may be an endpoint or a chip in an endpoint in the PCIe system 100, or may be a switching node or a chip in a switching node in the PCIe system 100. For example, the first node may be the endpoint 1 in the PCIe system 100, or may be a transmission node in the endpoint 1, for example, a transmitter/receiver (TX/RX). A camera is used as an example. Referring to FIG. 6, the camera may include a lens, a photosensitive element such as a complementary metal-oxide-semiconductor (CMOS), a TX/RX, and the like. The CMOS is configured to collect image data by using the lens, and send the image data to another node in the PCIe system 100 by using the TX/RX. In other words, the first node may be a camera or a TX/RX in a camera.

The first node may encapsulate the first data into a data payload of the first TLP. If the first node is an endpoint, the first data encapsulated by the first node may be data collected by the first node. For example, if the first node is a camera, the first data may be image data collected by the camera, and then the camera sends the collected image data to a second node. For another example, if the first node is a transmission node in an endpoint, the first data encapsulated by the first node may be image data collected by a transmission chip in the endpoint, and then the transmission node in the endpoint sends the collected image data to a second node. FIG. 6 is used as an example. In this case, the first data may be the image data collected by the CMOS, and then sent to a second node by using the TX/RX.

In S501, when encapsulating the first data into the first TLP, the first node may use the first field in the TLP header of the first TLP to indicate information required for transmitting the first data, so that the first data is transmitted to another node without using a root complex. The information required for transmitting the first data in the TLP may include the type of the first data. The data type may include an image type, an audio type, a control type, an SWRITE type, a security type, or the like. The image type is used to indicate that the data transmitted in the TLP is image data. The audio type is used to indicate that the data transmitted in the TLP is audio data. The control type is used to indicate that the TLP carries control information. The SWRITE type is used to indicate a manner of aligning the data transmitted in the TLP, for example, the data is read and written by using 4 bytes as a minimum unit. The security type is used to indicate that the TLP carries security information, for example, a key corresponding to an encryption case.

In another possible implementation, the first field may be a type field in the TLP header, in other words, the first node uses the type field in the TLP header of the first TLP to indicate the type of the first data.

Figure 7:
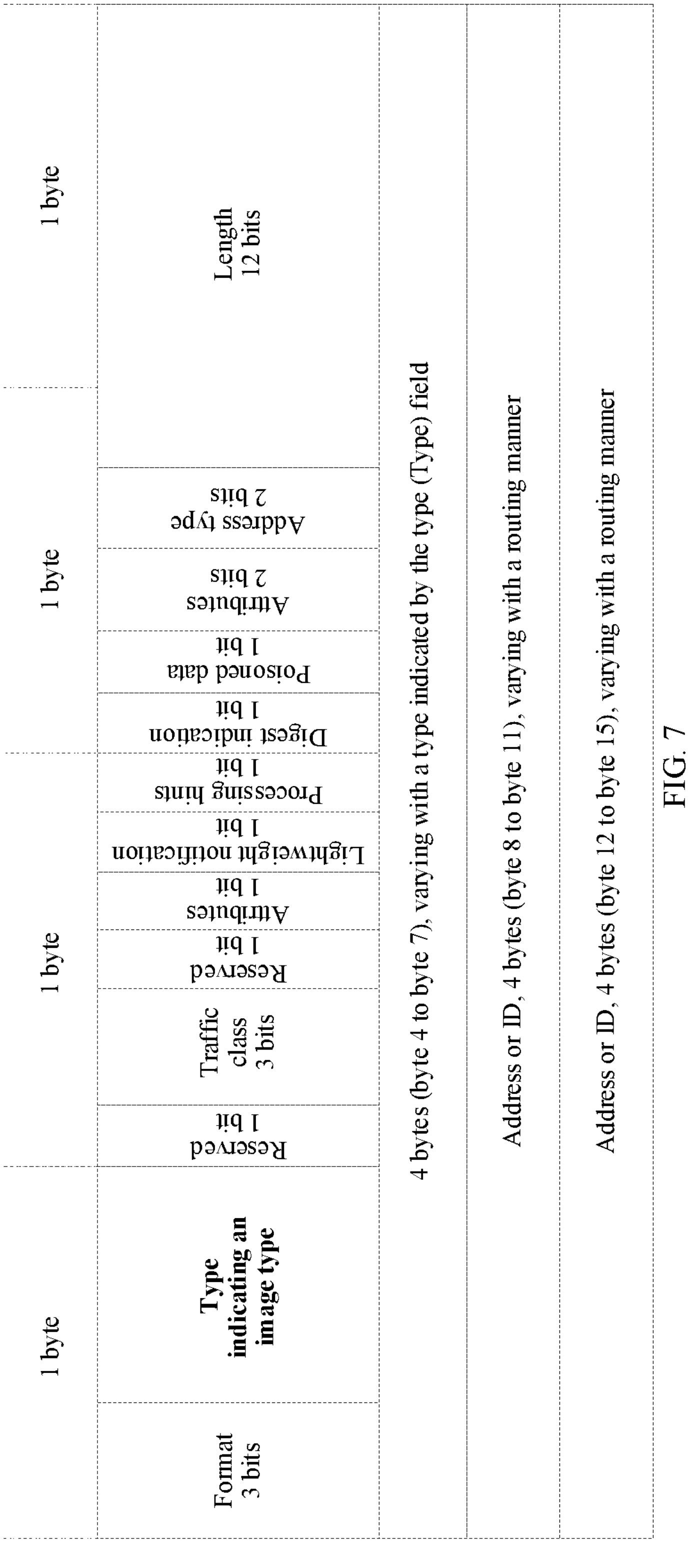
FIG. 7 is a schematic diagram of an image service according to an embodiment of this disclosure.

In example description, a reserved value (or a reserved status) in the type field may be used to indicate the data type of the first data. For example, any one of 13 status values: 00000, 00001, 00010, 00100, 00101, 11011, 10000, 10111, 01010, 01011, 01100, 01101, and 01110, in the type field is used to indicate the data type of the first data. In this implementation, none of the 13 status values is used, in other words, the type field is used to indicate only the data type, as shown in FIG. 7. Therefore, compatibility with an original data transmission method and the data transmission method provided in this embodiment of this disclosure may be implemented. For example, 00011 is used to indicate the image type, 00110 is used to indicate the audio type, 00111 is used to indicate the control type, 01000 is used to indicate the SWRITE type, and 01001 is used to indicate the security type. Therefore, a receiving-side node may determine a data transmission method based on whether a status value is a reserved status value. When the status value is a used status value, the receiving-side node may determine, based on the status value, that the data transmission method is the original data transmission method, and a PCIe service type. When the status value is a reserved status value, the receiving-side node may determine, based on the status value, that the data transmission method is the data transmission method provided in this embodiment of this disclosure, and the data type.

In a possible implementation, the TLP header of the first TLP further includes a second field, and the second field may be used to indicate identity information of a destination device (denoted as a third node) of the first TLP, for example, an address and an ID of the third node. The second field may be further used to indicate identity information of the first node, for example, an address and an ID of the first node. The third node may be an endpoint in the PCIe system 100 or a switching node in the PCIe system 100.

For example, the second field may be a byte 4 to a byte 15 in a 16-byte TLP header, or may be a byte 4 to a byte 11 in a 12-byte TLP header. If a length of the TLP header is 16 bytes, a byte 8 to the byte 15 in the TLP header may carry the identity information of the first node and the identity information of the third node. If a length of the TLP header is 12 bytes, a byte 8 to the byte 11 in the TLP header may carry the identity information of the first node and the identity information of the third node.

In a possible implementation, the first node may extract parameter information of the first data. The parameter information corresponds to the data type, and may be used to represent an attribute of the data type. At least one piece of parameter information corresponding to the data type may be as follows.

(1) When the data type is the image type, parameter information corresponding to the image type may include one or more of the following information: an image data type, for example, a raw image format, red, green, and blue (RGB), luma, blue projection, and red projection (YUV), embedded data, a compressed image, or an object in an image, a pixel quantization depth, for example, 12, 20, or 24, resolution, for example, 1080P, 2K, or 4K, and segment indication information. An image sensor outputs a row of images at a time. For an image with high resolution, a row of images cannot be transmitted in a TLP at a time, and the row of images needs to be transmitted by using a plurality of TLPs. The segment indication information is used to indicate a segment ranking of a current TLP in a current row.

(2) When the data type is the audio type, parameter information corresponding to the audio type may include one or more of the following information: a sampling quantization format, for example, floating-point quantization or integer quantization, a sampling frequency, for example, 24 kilohertz (KHz) or 48 KHz, a quantization depth, for example, 8 bits or 12 bits for each sample, and a quantity of voice channels/a quantity of channels. The quantity of voice channels is used to indicate a quantity of voice channels included in a current TLP, and the quantity of channels is used to indicate a quantity of channels included in a current TLP.

(3) When the data type is the control type, parameter information corresponding to the control type may include one or more of the following information: a control information type, for example, an Inter-Integrated Circuit (I2C), a general-purpose input/output (GPIO), or a serial peripheral interface (SPI), and a quantity of pieces of control information of each type. For example, a current TLP includes three I2Cs and eight GPIOs.

(4) When the data type is the security type, parameter information corresponding to the security type may include one or more of the following information: a message type, where a plurality of messages need to be exchanged to establish security, and each message for exchange is of a different type, for example, an authentication message or an encrypted message, a format indication that indicates a manner of grouping bits in a message and a meaning represented by each group, and key information corresponding to data that is carried in a current TLP and that is encrypted.

(5) When the data type is the SWRITE type, parameter information corresponding to the SWRITE type may include the following information: an alignment manner indicating that alignment is performed by using 4 bytes or 8 bytes as a minimum unit.

It may be understood that in this embodiment of this disclosure, the "parameter information" is merely an example name, and may be another name in specific implementation, for example, may also be referred to as an attribute, an attribute parameter, or an encapsulation parameter, or may be referred to as A. Provided that A has a meaning the same as or similar to that of the parameter information in this embodiment of this disclosure, A may be understood as the parameter information in this embodiment of this disclosure.

FIG. 6 is used as an example. If the first node is a camera, the first node may determine an image data type, a pixel quantization depth, resolution, and the like of the collected image data, may calculate an amount of data in each row of an image based on the image data type, the pixel quantization depth, the resolution, and the like, may obtain, with reference to a maximum amount of data carried in each TLP, a quantity of TLPs required for transmitting a row of images, to determine a segmentation manner of the image, and then may determine segment indication information based on the segmentation manner. If the first node is a TX/RX in a camera, the first node may receive the image data collected by the CMOS. The image data includes parameter information such as an image data type, a pixel quantization depth, and resolution. The first node may calculate an amount of data in each row of an image based on the image data type, the pixel quantization depth, the resolution, and the like included in the image data, may obtain, with reference to a maximum amount of data carried in each TLP, a quantity of TLPs required for transmitting a row of images, to determine a segmentation manner of the image, and then may determine segment indication information based on the segmentation manner.

Figure 8:
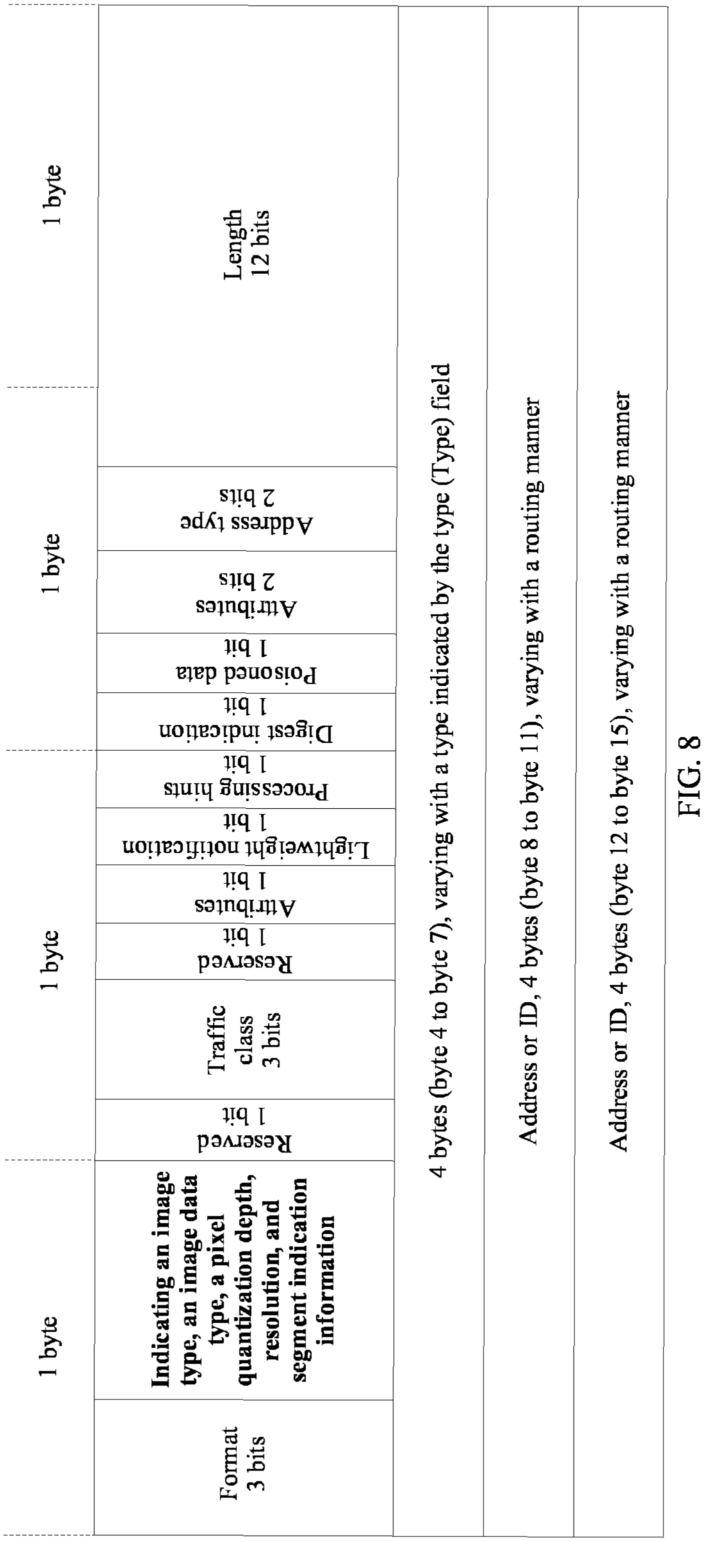
FIG. 8 is a schematic diagram of another image service according to an embodiment of this disclosure.

In an example, the first field in the TLP header may be used to indicate the data type and the at least one piece of parameter information corresponding to the data type. Further, the 13 reserved status values in the type field may be used to indicate the data type and the at least one piece of parameter information corresponding to the data type. In this implementation, the data type and the at least one piece of parameter information corresponding to the data type may be bound, and a plurality of information sets are obtained after binding. For example, an information set 1 includes that the data type is the image type, the image type is YUV, the image resolution is 2K, the pixel quantization depth is 12, and the current TLP is the first segment in the current row, an information set 2 includes that the data type is the image type, the image type is YUV, the image resolution is 2K, the pixel quantization depth is 12, and the current TLP is the second segment in the current row, and an information set 3 includes that the data type is the image type, the image type is RGB, the image resolution is 4K, the pixel quantization depth is 12, and the current TLP is the first segment in the current row. For example, the data type of the first data is the image type, and the reserved status value in the type field is used to indicate the image type, the image data type, the pixel quantization depth, the resolution, and the segment indication information, as shown in FIG. 8. It should be understood that FIG. 8 is merely an example for description, and a length and a location of each piece of parameter information in the TLP header are not limited.

Figure 9:
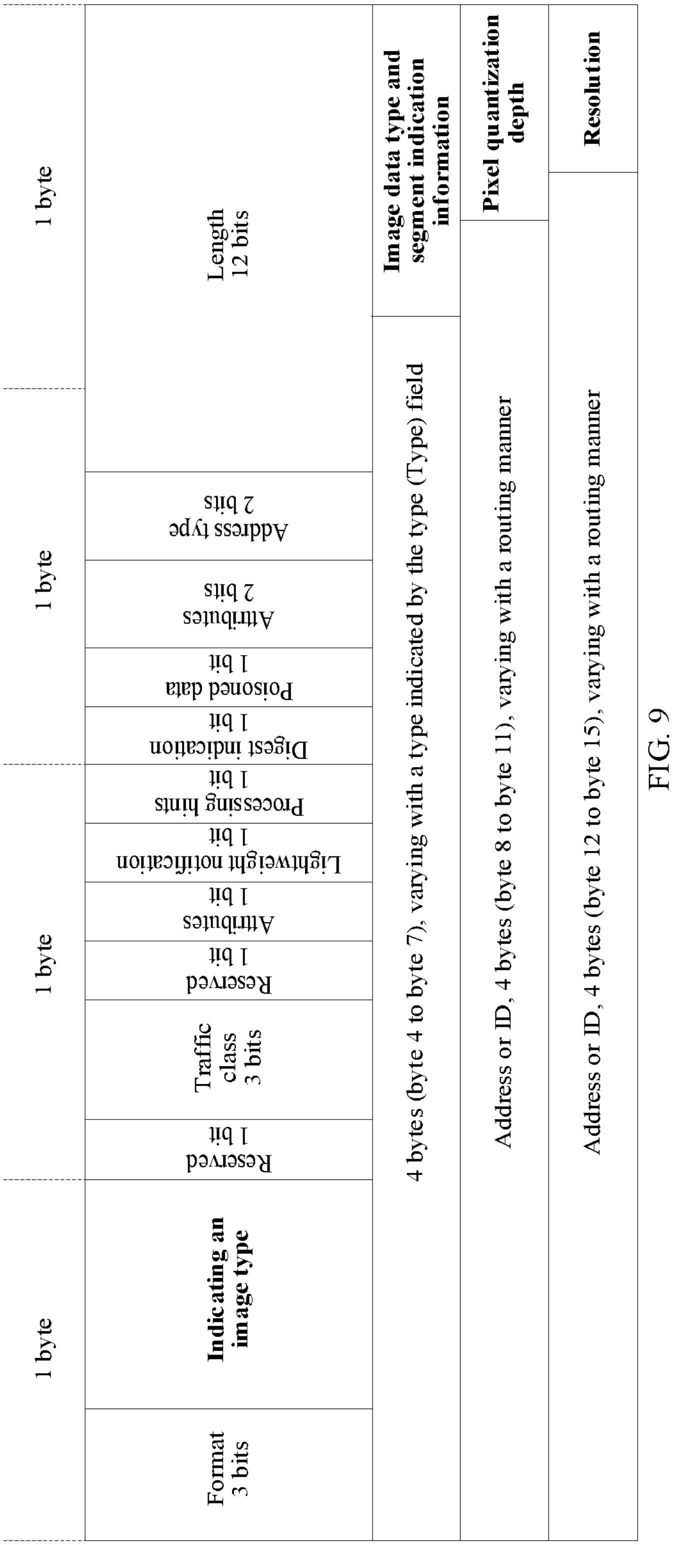
FIG. 9 is a schematic diagram of another image service according to an embodiment of this disclosure.

In another example, the first field may be used to indicate the data type, and the second field may be used to indicate the at least one piece of parameter information corresponding to the data type. Further, the 13 reserved status values in the type field may be used to indicate the data type, and the second field may be used to indicate the at least one piece of parameter information corresponding to the data type. In this implementation, the type field may not indicate the parameter information. For example, the data type of the first data is the image type, and the reserved status value in the type field is used to indicate the image type, and the second field is used to indicate the image data type, the pixel quantization depth, the resolution, and the segment indication information, as shown in FIG. 9. It should be understood that FIG. 9 is merely an example for description, and a length and a location of each piece of parameter information in the TLP header are not limited.

Figure 10:
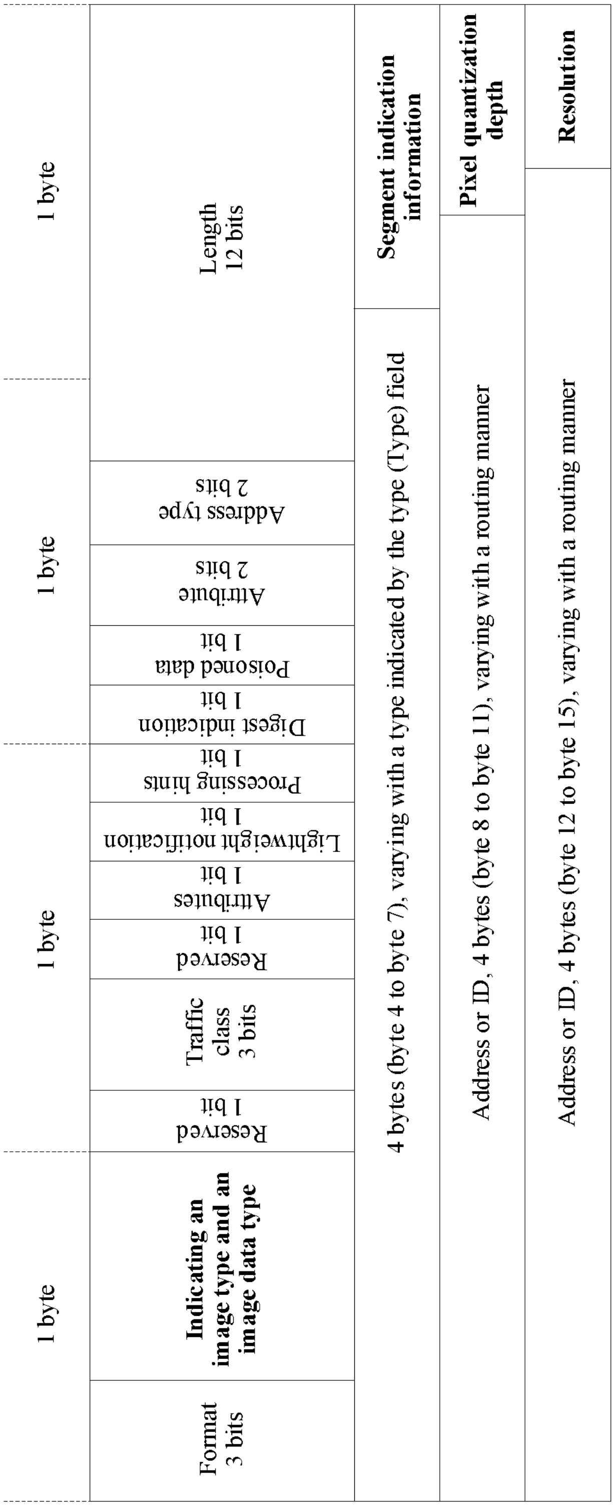
FIG. 10 is a schematic diagram of another image service according to an embodiment of this disclosure.

In another example, a first resource may be used to indicate the data type and first parameter information, and the second field may be used to indicate second parameter information. The second parameter information is parameter information other than the first parameter information in the parameter information corresponding to the data type. In other words, the first field and the second field are used to respectively indicate different parameter information corresponding to the data type. Further, the 13 reserved status values in the type field may be used to indicate the data type and the first parameter information, and the second field may be used to indicate the second parameter information. For example, the data type of the first data is the image type, and the reserved status value in the type field is used to indicate the image type and the image data type, and the second field is used to indicate the pixel quantization depth, the resolution, and the segment indication information, as shown in FIG. 10. It should be understood that FIG. 10 is merely an example for description, and a length and a location of each piece of parameter information in the TLP header are not limited.

It should be noted that in this embodiment of this disclosure, in the foregoing manner, one format of one of the image type, the audio type, the control type, the SWRITE type, and the security type may be indicated, a plurality of formats of one of the image type, the audio type, the control type, the SWRITE type, and the security type may be indicated, a plurality of formats of a plurality of data types in the image type, the audio type, the control type, the SWRITE type, and the security type may be indicated, a mixture (for example, security information in an image format and audio data that includes security information) of a plurality of data types in the image type, the audio type, the control type, the SWRITE type, and the security type may be indicated, or another data type and format may be indicated. This is not limited in this embodiment of this disclosure.

S502: The first node sends the first TLP to the second node.

The second node may be an endpoint or a chip in an endpoint in the PCIe system 100, or may be a switching node or a chip in a switching node in the PCIe system 100. In an example, the second node may be a switching node in a connection relationship with the first node. For example, if the first node is the endpoint 1, the second node is the switching node 1.

S503: After receiving the first TLP, the second node sends a second TLP to the third node.

Further, the second node receives the first TLP from the first node, and decapsulates the first TLP to obtain the identity information of the third node. The second node determines a routing path based on the identity information of the third node, and then sends the second TLP to the third node based on the routing path.

In a possible implementation, the first TLP received by the second node and the second TLP sent by the second node are a same TLP. That is, after receiving the first TLP sent by the first node, the second node forwards the first TLP to the third node.

In another possible implementation, the first TLP received by the second node and the second TLP sent by the second node are different TLPs. That is, after receiving the first TLP sent by the first node, the second node processes the first TLP, for example, modifies identity information of a source node of the first TLP from the identity information of the first node to identity information of the second node, and then sends the second TLP obtained through processing to the third node. The first TLP received by the second node and the second TLP sent by the second node carry the same first data and parameter information. For a manner in which the second TLP sent by the second node carries the first data and the parameter information, refer to related description in step S501. Details are not described herein.

S504: The third node obtains the first data based on the first field.

Further, the third node receives the second TLP from the second node, decapsulates the second TLP to obtain the first field in a second TLP header, and then obtains the first data based on the first field.

In an example, the third node may determine the data type and the parameter information corresponding to the data type based on a type field in the TLP header. For example, as shown in FIG. 8, the third node may determine, based on a status value in the type field in the TLP header, that the data type of the first data is the image type and the image data type, the pixel quantization depth, the resolution, and the segment indication information of the first data.

In another example, the third node may determine the data type based on a type field in the TLP header, and determine the at least one piece of parameter information corresponding to the data type based on a second field in the TLP header. For example, as shown in FIG. 9, the third node may determine, based on a status value in the type field in the TLP header, that the data type of the first data is the image type, and determine the image data type, the pixel quantization depth, the resolution, and the segment indication information of the first data based on the second field in the TLP header.

In another example, the third node may determine the data type and the first parameter information based on a type field in the TLP header, and determine the second parameter information based on a second field in the TLP header. The second parameter information is parameter information other than the first parameter information in the parameter information corresponding to the data type. For example, as shown in FIG. 10, the third node may determine, based on a status value in the type field in the TLP header, that the data type of the first data is the image type and the image data type of the first data, and determine the pixel quantization depth, the resolution, and the segment indication information of the first data based on the second field in the TLP header.

It should be noted that the transmission method shown in FIG. 5 may be applied to a single PCIe system shown in FIG. 1 or a single PCIe system shown in FIG. 2. This is not limited in this embodiment of this disclosure.

The PCIe system 100 and the PCIe system 200 shown in FIG. 2 are used as an example. The first node may be the endpoint 3, the second node may be the switching node 2, and the third node may be the endpoint 4. A procedure of transmitting the first data from the endpoint 3 to the endpoint 4 includes the following steps.

A1: The endpoint 3 sends a first TLP to the switching node 2, where the first TLP includes the first data, a type field in a TLP header of the first TLP indicates a data type and parameter information, and a second field in the TLP header indicates identity information of the endpoint 3 and identity information of the endpoint 4 (For a specific encapsulation manner, refer to S501. Details are not described herein).

A2: After receiving the first TLP, the switching node 2 decapsulates the TLP header of the first TLP to obtain the identity information of the endpoint 4, and sends the first TLP to an NTB in the switching node based on the identity information of the endpoint 4.

A3: After receiving the first TLP, the NTB in the switching node 2 decapsulates the TLP header of the first TLP to obtain the identity information of the endpoint 4, and may translate/convert the identity information of the endpoint 4, to obtain a second TLP, and send the second TLP to an NTB in the switching node 3, where the second TLP includes the first data, a type field in a TLP header of the second TLP indicates the data type and the parameter information, and a second field in the TLP header indicates the identity information of the endpoint 3 and the identity information of the endpoint 4. The first TLP and the second TLP may be the same or different. For example, the NTB in the switching node 2 translates/converts the identity information of the endpoint 4, and finds the NTB in the switching node 3. In a translation/conversion process, if the NTB in the switching node 2 modifies the identity information of the endpoint 4 to identity information that can be recognized by the PCIe system 200, the second TLP is different from the first TLP, or if the NTB in the switching node 2 does not modify the identity information of the endpoint 4 to identity information that can be recognized by the PCIe system 200, the second TLP is the same as the first TLP.

A4: After receiving the second TLP, the NTB in the switching node 3 decapsulates the TLP header of the first TLP to obtain the identity information of the endpoint 4, and may translate/convert the identity information of the endpoint 4, to obtain a third TLP, and send the third TLP to the NTB in the switching node 3, where the third TLP includes the first data, a type field in a TLP header of the third TLP indicates the data type and the parameter information, and a second field in the TLP header indicates the identity information of the endpoint 3 and the identity information of the endpoint 4. The third TLP and the second TLP may be the same or different (similar to step A3 in which the first TLP and the second TLP may be the same or different).

A5: After receiving the third TLP, the switching node 3 decapsulates the TLP header of the third TLP to obtain the identity information of the endpoint 4, and sends the third TLP to the endpoint 4 based on the identity information of the endpoint 4, and after receiving the third TLP, the endpoint 4 decapsulates the TLP header of the third TLP to obtain the type field, and obtains the first data based on the type field (for a specific data obtaining process, refer to S504. Details are not described herein), to complete data transmission between PCIe systems.

It should be noted that for a specific implementation process of translating/converting the identity information by the NTB, refer to the conventional technology. This is not limited in this embodiment of this disclosure.

Figure 11:
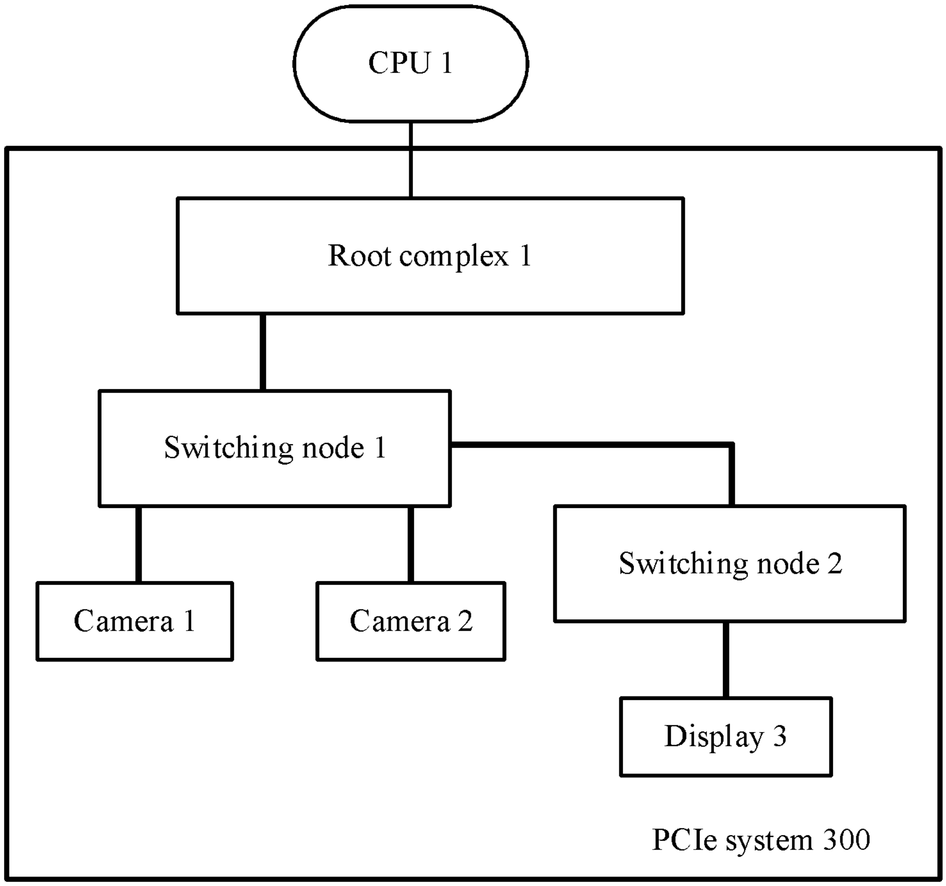
FIG. 11 is a schematic diagram of an architecture of a PCIe system according to an embodiment of this disclosure.

A data transmission process is described below in detail with reference to a PCIe system shown in FIG. 11. Referring to FIG. 11, the PCIe system 300 includes a root complex 1, a switching node 1, a camera 1 in a connection relationship with the switching node 1, a camera 2, a switching node 2, and a display 3 in a connection relationship with the switching node 2. The camera 1 sends captured image data to the display 3 for display.

Figure 12:
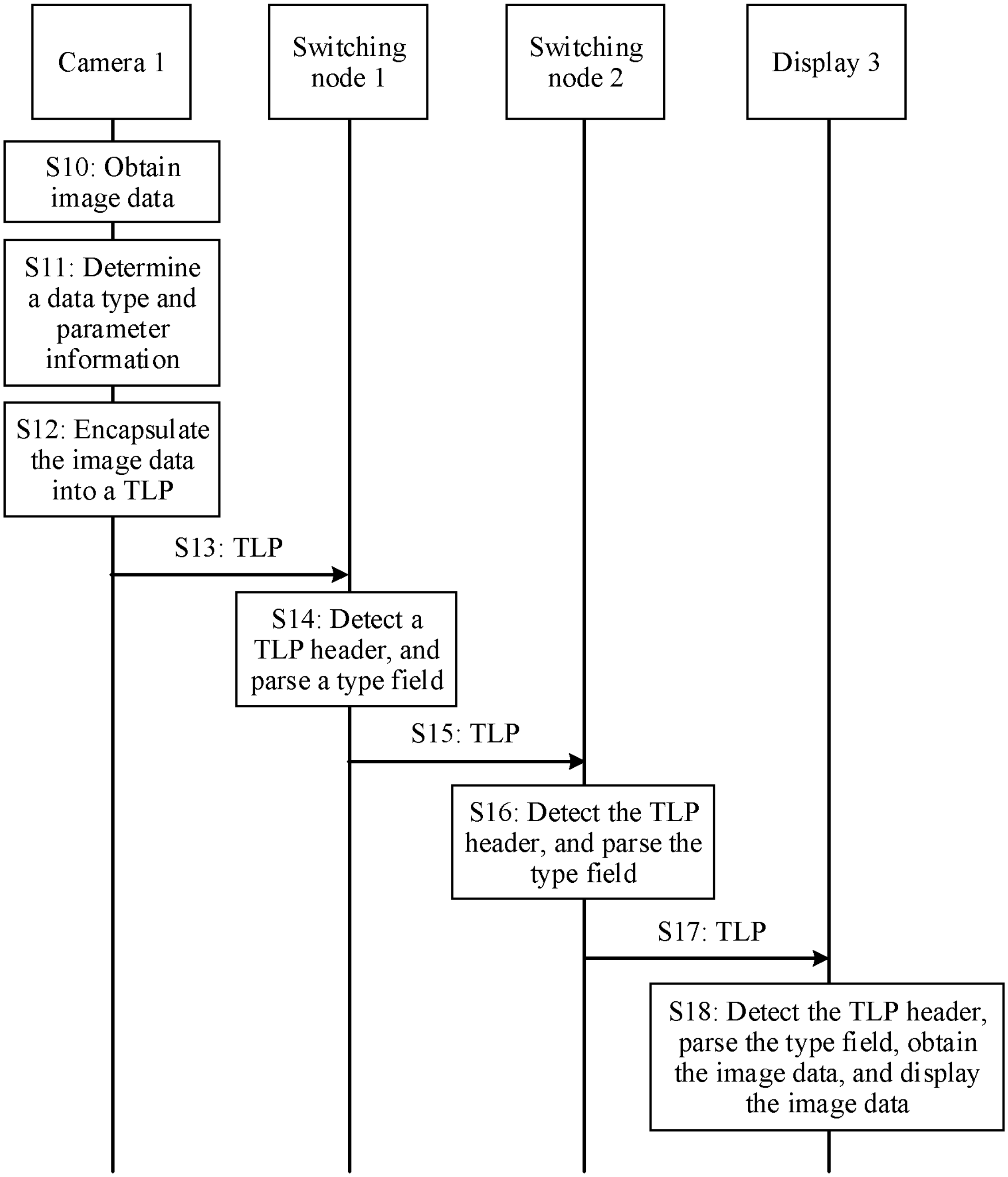
FIG. 12 is a schematic flowchart of a data transmission method according to an embodiment of this disclosure.

The camera 1 transmits the captured image data to the switching node 1 and the switching node 2 by using the method performed by the first node in the foregoing embodiment (or the procedure shown in FIG. 5). The switching node 2 may transmit, by using the method performed by the second node in the foregoing embodiment (or the procedure shown in FIG. 5), the image data to the display 3 for display. The display 3 may obtain the image data by using the method performed by the third node in the foregoing embodiment (or the procedure shown in FIG. 5). An example in which a length of a TLP header is 16 bytes, and a TLP received by the switching node 1 or 2 is the same as a TLP sent by the switching node 1 or 2. FIG. 12 shows a specific process in which the camera 1 transmits the image data to the display 3 for display.

S10: The camera 1 captures the image data.

The camera 1 may perform photographing in response to a photographing instruction (for example, triggered by using a photographing button of the camera 1), to obtain the image data.

S11: The camera 1 determines, based on the image data, that a data type of the image data is an image type and parameter information of the image data, for example, an image data type (for example, RGB or YUV), a quantity of bits used for quantifying each pixel, and image resolution (for example, 2K or 4K), and may further calculate an amount of data in each row of an image, determine, based on a maximum amount of data carried in each TLP, a quantity of TLPs required for transmitting a row of images, and then determine a segmentation manner of the image, to determine segment indication information.

S12: The camera 1 encapsulates the image data into a TLP.

For example, the camera 1 may encapsulate the image data into a TLP in any one of the following three manners.

Manner 1: A type field in a TLP header may be used to indicate information, for example, the data type: the image type and the parameter information of the image data: the image data type, the pixel quantization depth, the resolution, and the segment indication information, required for transmitting the image data. If a reserved value in the type field is used to indicate the data type and the parameter information, as shown in FIG. 8, the camera 1 further pads a data payload with the image data, and pads a byte 8 to a byte 15 in the TLP header with identity information (for example, an ID and an address) of the camera 1 and identity information (for example, an ID and an address) of the display 3.

Manner 2: A type field and a second field in a TLP header may be used to indicate information required for transmitting the image data. The type field indicates the data type, namely, the image type, and the second field (for example, a byte 4 to a byte 15) indicates the parameter information of the image data, for example, the data type: the image type and the parameter information of the image data: the image data type, the pixel quantization depth, the resolution, and the segment indication information. If a reserved value in the type field is used to indicate the data type, as shown in FIG. 9, the camera 1 further pads a data payload with the image data, and pads a byte 8 to the byte 15 in the TLP header with identity information (for example, an ID and an address) of the camera 1 and identity information (for example, an ID and an address) of the display 3.

Manner 3: A type field and a second field in a TLP header may be used to indicate information required for transmitting the image data. The type field indicates the data type, namely, the image type, and a part of the parameter information of the image data, and the second field (for example, a byte 4 to a byte 15) indicates the remaining parameter information of the image data, for example, the data type: the image type, a part of the parameter information: the image data type, and the remaining parameter information of the image data: the pixel quantization depth, the resolution, and the segment indication information. If a reserved value in the type field is used to indicate the data type and a part of the parameter information, as shown in FIG. 10, the camera 1 further pads a data payload with the image data, and pads a byte 8 to the byte 15 in the TLP header with identity information (for example, an ID and an address) of the camera 1 and identity information (for example, an ID and an address) of the display 3.

S13: The camera 1 sends the TLP to the switching node 1 in a connection relationship with the camera 1.

S14: After receiving the TLP, the switching node 1 detects the TLP header, and parses the type field.

S15: After determining that the type field is content defined in this embodiment of this disclosure, determine a routing path based on the identity information of the display 2 in the TLP, and send the TLP to the switching node 2 in a connection relationship with the display 2 based on the routing path.

In S14 and S15, if determining that the type field is content defined in an existing PCIe system, the switching node 1 performs processing based on a working mechanism of the existing PCIe system, that is, sends the TLP to the root complex 1, and the root complex 1 determines a receiving-side node based on configuration space of each endpoint (for example, the camera 2 and the display 3), and then sends the TLP to the receiving-side node or a switching node in a connection relationship with the receiving-side node.

S16: After receiving the TLP, the switching node 2 detects the TLP header, and parses the type field.

S17: After determining that the type field is the content defined in this embodiment of this disclosure, send the TLP to the display 2 based on the identity information of the display 2 in the TLP.

In S16 and S17, if determining that the type field is the content defined in the existing PCIe system, the switching node 2 performs processing based on the working mechanism of the existing PCIe system, that is, sends the TLP to the root complex 1, and the root complex 1 determines a receiving-side node based on the configuration space of each endpoint (for example, the camera 2 and the display 3), and then sends the TLP to the receiving-side node or a switching node in a connection relationship with the receiving-side node.

S18: After receiving the TLP, the display 2 detects the TLP header, parses the type field, obtains the data type and the parameter information of the image data, restores a complete image based on the parameter information (for example, the segment indication information), and displays the image on a display screen.

For example, for the three encapsulation manners in S12, the display 3 may decapsulate the TLP in the following manner.

Corresponding to the manner 1 in S12, the display 3 parses the type field in the TLP header, and determines, based on the status value in the type field, that the data type is the image type and the parameter information of the image data, for example, the image data type of the image data, the pixel quantization depth of the image data, the resolution of the image data, and the segment indication information of the image data.

Corresponding to the manner 2 in S12, the display 3 parses the type field in the TLP header, determines, based on the status value in the type field, that the data type is the image type, and determines the parameter information, for example, the image data type of the image data, the pixel quantization depth of the image data, the resolution of the image data, and the segment indication information of the image data, of the image data by parsing the byte 4 to the byte 15 in the TLP header.

Corresponding to the manner 3 in S12, the display 3 parses the type field in the TLP header, determines, based on the status value in the type field, that the data type is the image type and a part of the parameter information, for example, the image data type of the image data, of the image data, and determines the remaining parameter information, for example, the pixel quantization depth of the image data, the resolution of the image data, and the segment indication information of the image data, of the image data by parsing the byte 4 to the byte 15 in the TLP header.

In the foregoing embodiment of this disclosure, a type field is used to indicate information, for example, a data type and parameter information corresponding to the data type, required for transmitting information in a TLP. In this way, communication between nodes (for example, communication between endpoints, communication between switching nodes, or communication between an endpoint and a switching node) in a PCIe system may be performed without using a root complex, to reduce complexity of communication between the nodes in the PCIe system.

Figure 13:
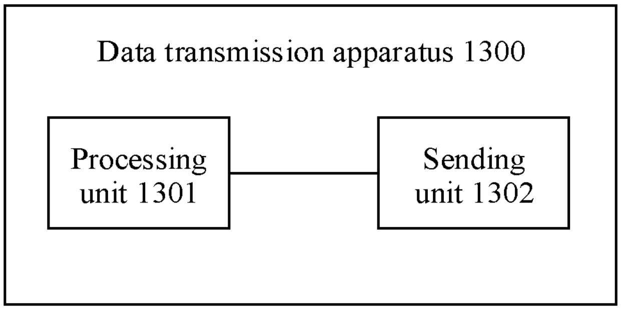
FIG. 13 is a schematic diagram of a structure of a data transmission apparatus according to an embodiment of this disclosure.

Based on a same technical concept as the method embodiments, an embodiment of this disclosure provides a data transmission apparatus. A structure of the apparatus may be shown in FIG. 13, and includes a processing unit 1301 and a sending unit 1302.

The data transmission apparatus 1300 may be configured to implement the method performed by the first node in the embodiments in FIG. 5 to FIG. 12. The apparatus 1300 may be the first node, a chip or a chip set in the first node, or a part of a chip configured to perform a related function in the method. The processing unit 1301 is configured to encapsulate first data into a first TLP. A TLP header of the first TLP includes a first field, and the first field is used to indicate a data type of the first data. The sending unit 1302 is configured to send the first TLP to a second node.

In a possible implementation, the data type includes at least one of the following: an image type, a video type, a control type, a security type, and a SWRITE type.

In another possible implementation, the first field is further used to indicate at least one piece of parameter information corresponding to the data type.

In another possible implementation, the first field is a type field in the TLP header of the first TLP.

In another possible implementation, a value of the first field is a reserved value.

In another possible implementation, the TLP header of the first TLP further includes a second field, the second field is used to indicate identity information of a third node, and the third node is a destination device of the first TLP.

In another possible implementation, when the first field is used to indicate only the data type of the first data, the second field is further used to indicate the at least one piece of parameter information corresponding to the data type.

In another possible implementation, the second field is a byte 4 to a byte 15 or a byte 4 to a byte 11 in the TLP header of the first TLP.

In embodiments of this disclosure, division into the modules is an example, and is merely logical function division. In an actual implementation, there may be another division manner. In addition, function modules in embodiments of this disclosure may be integrated into one processor, or each of the modules may exist alone physically, or two or more modules may be integrated into one module. The integrated module may be implemented in a form of hardware, or may be implemented in a form of a software function module. It may be understood that for functions or implementations of modules in embodiments of this disclosure, further refer to related descriptions in the method embodiments.

Figure 14:
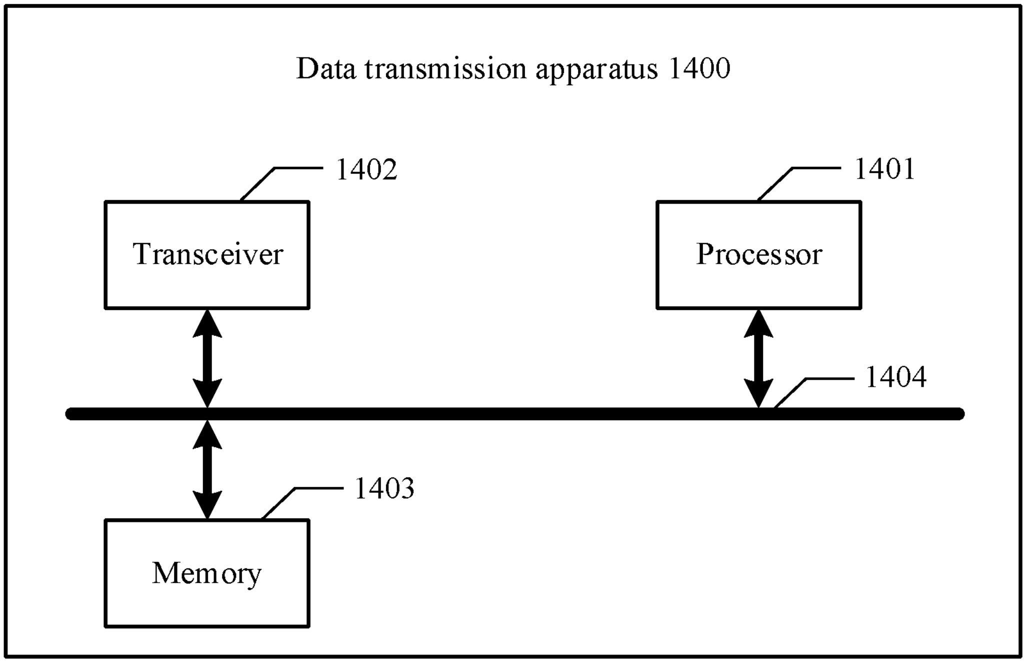
FIG. 14 is a schematic diagram of a structure of another data transmission apparatus according to an embodiment of this disclosure.

In a possible implementation, a data transmission apparatus 1400 may be shown in FIG. 14. The apparatus 1400 may be an endpoint or a chip in an endpoint. The apparatus 1400 may include a processor 1401, and may further include a transceiver 1402 and a memory 1403. The processing unit 1301 may be the processor 1401. The sending unit 1302 may be the transceiver 1402.

The processor 1401 may be a CPU, a digital processing unit, or the like. The transceiver 1402 may be a communications interface, an interface circuit such as a transceiver circuit, a transceiver chip, or the like. The apparatus 1400 further includes the memory 1403, configured to store a program to be executed by the processor 1401. The memory 1403 may be a nonvolatile memory such as a hard disk drive (HDD) or a solid-state drive (SSD), or may be a volatile memory such as a RAM. The memory 1403 is any other medium that can carry or store expected program code in a form of an instruction or a data structure and that can be accessed by a computer, but is not limited thereto.

The processor 1401 is configured to execute program code stored in the memory 1403, and is further configured to perform the action performed by the processing unit 1301. Details are not described herein in this disclosure. The transceiver 1402 is further configured to perform the action performed by the sending unit 1302. Details are not described herein in this disclosure.

In this embodiment of this disclosure, a specific connection medium between the transceiver 1402, the processor 1401, and the memory 1403 is not limited. In this embodiment of this disclosure, the memory 1403, the processor 1401, and the transceiver 1402 are connected by using a bus 1404 in FIG. 14. The bus is represented by using a thick line in FIG. 14. A connection manner between other components is merely an example for description, and constitutes no limitation. The bus 1404 may be classified into an address bus, a data bus, a control bus, and the like. For ease of representation, only one thick line is used to represent the bus in FIG. 14, but this does not mean that there is only one bus or only one type of bus.

Figure 15:
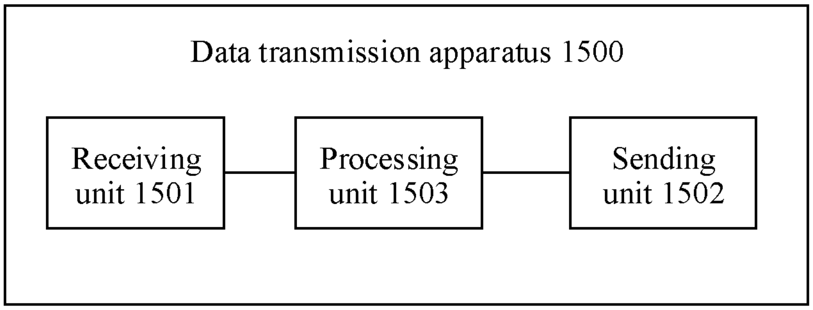
FIG. 15 is a schematic diagram of a structure of another data transmission apparatus according to an embodiment of this disclosure.

Based on a same technical concept as the method embodiments, an embodiment of this disclosure provides a data transmission apparatus 1500. A structure of the apparatus 1500 may be shown in FIG. 15, and includes a receiving unit 1501, a sending unit 1502, and a processing unit 1503.

The data transmission apparatus 1500 may implement the method performed by the second node in the embodiments in FIG. 5 to FIG. 12. The apparatus 1500 may be the second node, a chip or a chip set in the second node, or a part of a chip configured to perform a related function in the method. The receiving unit 1501 is configured to receive a first TLP from a first node. The first TLP includes first data. The sending unit 1502 is configured to send a second TLP to a third node. The second TLP includes the first data. A TLP header of the TLP includes a first field, and the first field is used to indicate a data type of the first data. The TLP includes the first TLP and/or the second TLP.

In a possible implementation, the data type includes at least one of the following: an image type, a video type, a control type, a security type, and a SWRITE type.

In a possible implementation, that the second TLP includes the first data may be understood as that content of data included in the second TLP is the same as that of data included in the second TLP.

In another possible implementation, the first field is further used to indicate at least one piece of parameter information corresponding to the data type.

In another possible implementation, the first field is a type field in the TLP header.

In another possible implementation, a value of the first field is a reserved value.

In another possible implementation, the TLP header further includes a second field, and the second field is used to indicate identity information of the third node.

In another possible implementation, when the first field is used to indicate only the data type of the first data, the second field is further used to indicate the at least one piece of parameter information corresponding to the data type.

In another possible implementation, the second field is a byte 4 to a byte 15 or a byte 4 to a byte 11 in the TLP header of the TLP.

In another possible implementation, the apparatus 1500 further includes the processing unit 1503. The processing unit 1503 is configured to determine a routing path based on the identity information of the third node. The sending unit 1502 is further configured to send the second TLP to the third node based on the routing path.

In embodiments of this disclosure, division into the modules is an example, and is merely logical function division. In an actual implementation, there may be another division manner. In addition, function modules in embodiments of this disclosure may be integrated into one processor, or each of the modules may exist alone physically, or two or more modules may be integrated into one module. The integrated module may be implemented in a form of hardware, or may be implemented in a form of a software function module. It may be understood that for functions or implementations of modules in embodiments of this disclosure, further refer to related descriptions in the method embodiments.

Figure 16:
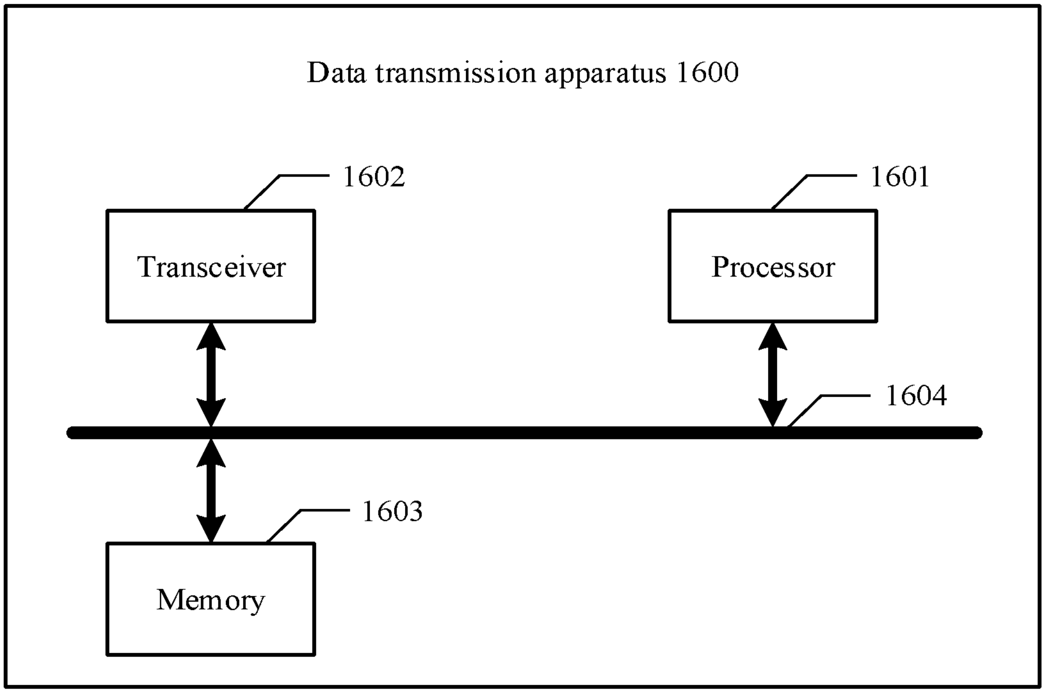
FIG. 16 is a schematic diagram of a structure of another data transmission apparatus according to an embodiment of this disclosure.

In a possible implementation, a data transmission apparatus 1600 may be shown in FIG. 16. The apparatus 1600 may be an endpoint or a chip in an endpoint. The apparatus 1600 may include a processor 1601, and may further include a transceiver 1602 and a memory 1603. The processing unit 1503 may be the processor 1601. The receiving unit 1501 and the sending unit 1502 may be the transceiver 1602.

The processor 1601 may be a CPU, a digital processing unit, or the like. The transceiver 1602 may be a communications interface, an interface circuit such as a transceiver circuit, a transceiver chip, or the like. The apparatus 1600 further includes the memory 1603, configured to store a program to be executed by the processor 1601. The memory 1603 may be a nonvolatile memory such as an HDD or an SSD, or may be a volatile memory such as a RAM. The memory 1603 is any other medium that can carry or store expected program code in a form of an instruction or a data structure and that can be accessed by a computer, but is not limited thereto.

The processor 1601 is configured to execute program code stored in the memory 1603, and is further configured to perform the action performed by the processing unit 1503. Details are not described herein in this disclosure. The transceiver 1602 is further configured to perform the actions performed by the receiving unit 1501 and the sending unit 1502. Details are not described herein in this disclosure.

In this embodiment of this disclosure, a specific connection medium between the transceiver 1602, the processor 1601, and the memory 1603 is not limited. In this embodiment of this disclosure, the memory 1603, the processor 1601, and the transceiver 1602 are connected by using a bus 1604 in FIG. 16. The bus is represented by using a thick line in FIG. 16. A connection manner between other components is merely an example for description, and constitutes no limitation. The bus 1604 may be classified into an address bus, a data bus, a control bus, and the like. For ease of representation, only one thick line is used to represent the bus in FIG. 16, but this does not mean that there is only one bus or only one type of bus.

Figure 17:
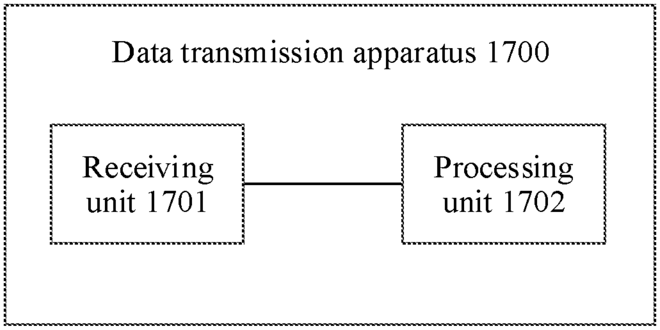
FIG. 17 is a schematic diagram of a structure of another data transmission apparatus according to an embodiment of this disclosure.

Based on a same technical concept as the method embodiments, an embodiment of this disclosure provides a data transmission apparatus. A structure of the apparatus may be shown in FIG. 17, and includes a receiving unit 1701 and a processing unit 1702.

The data transmission apparatus 1700 may be further configured to implement the method performed by the third node in the embodiments in FIG. 5 to FIG. 12. The apparatus 1700 may be the third node, a chip or a chipset in the third node, or a part of a chip configured to perform a related function in the method. The receiving unit 1701 is configured to receive a second TLP from a second node. The second TLP includes first data, a TLP header of the second TLP includes a first field, and the first field is used to indicate a data type of the first data. The processing unit 1702 is configured to obtain the first data based on the first field.

In a possible implementation, the data type includes at least one of the following: an image type, a video type, a control type, a security type, and a SWRITE type.

In a possible implementation, the first field is further used to indicate at least one piece of parameter information corresponding to the data type.

In another possible implementation, the first field is a type field in the second TLP header.

In another possible implementation, a value of the first field is a reserved value.

In another possible implementation, the second TLP header further includes a second field, and the second field is used to indicate identity information of the third node.

In another possible implementation, when the first field is used to indicate only the data type of the first data, the second field is further used to indicate the at least one piece of parameter information corresponding to the data type.

In another possible implementation, the second field is a byte 4 to a byte 15 or a byte 4 to a byte 11 in the second TLP header.

In embodiments of this disclosure, division into the modules is an example, and is merely logical function division. In an actual implementation, there may be another division manner. In addition, function modules in embodiments of this disclosure may be integrated into one processor, or each of the modules may exist alone physically, or two or more modules may be integrated into one module. The integrated module may be implemented in a form of hardware, or may be implemented in a form of a software function module. It may be understood that, for functions or implementations of the modules in embodiments of this disclosure, further refer to related descriptions in the method embodiments.

Figure 18:
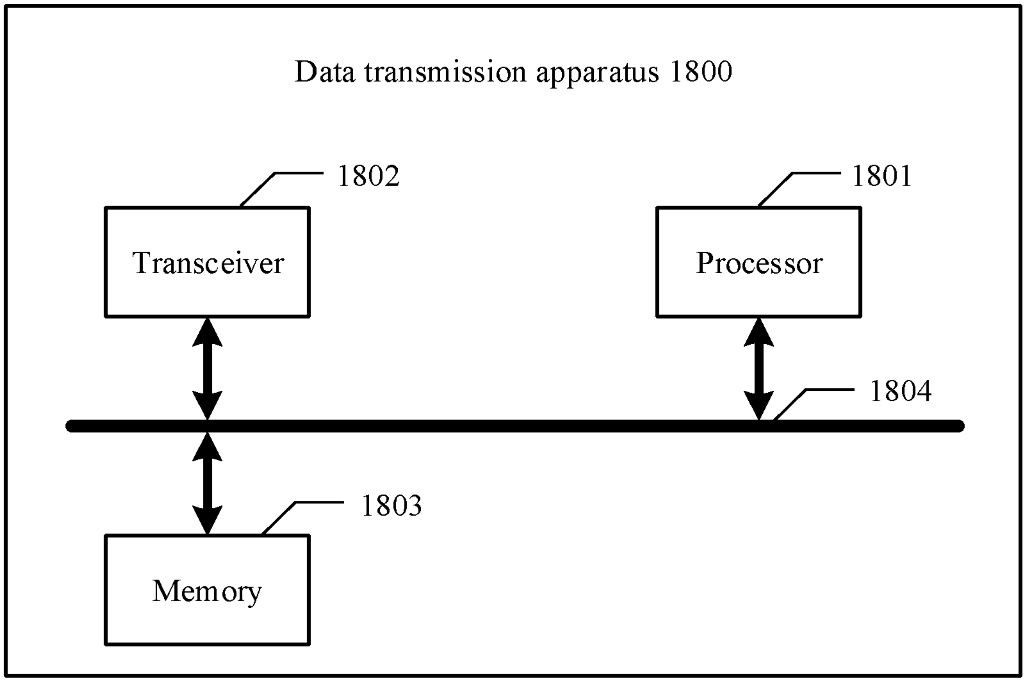
FIG. 18 is a schematic diagram of a structure of another data transmission apparatus according to an embodiment of this disclosure.

In a possible implementation, a data transmission apparatus 1800 may be shown in FIG. 18. The apparatus 1800 may be an endpoint or a chip in an endpoint. The apparatus 1800 may include a processor 1801, and may further include a transceiver 1802 and a memory 1803. The processing unit 1702 may be the processor 1801. The receiving unit 1701 may be the transceiver 1802.

The processor 1801 may be a CPU, a digital processing unit, or the like. The transceiver 1802 may be a communications interface, an interface circuit such as a transceiver circuit, a transceiver chip, or the like. The apparatus 1800 further includes the memory 1803, configured to store a program to be executed by the processor 1801. The memory 1803 may be a nonvolatile memory such as an HDD or an SSD, or may be a volatile memory such as a RAM. The memory 1803 is any other medium that can carry or store expected program code in a form of an instruction or a data structure and that can be accessed by a computer, but is not limited thereto.

The processor 1801 is configured to execute program code stored in the memory 1803, and is further configured to perform the action performed by the processing unit 1702. Details are not described in this disclosure. The transceiver 1802 is further configured to perform the action performed by the receiving unit 1701. Details are not described in this disclosure.

In this embodiment of this disclosure, a specific connection medium between the transceiver 1802, the processor 1801, and the memory 1803 is not limited. In this embodiment of this disclosure, the memory 1803, the processor 1801, and the transceiver 1802 are connected by using a bus 1804 in FIG. 18. The bus is represented by using a thick line in FIG. 18. A connection manner between other components is merely an example for description, and constitutes no limitation. The bus 1804 may be classified into an address bus, a data bus, a control bus, and the like. For ease of representation, only one thick line is used to represent the bus in FIG. 18, but this does not mean that there is only one bus or only one type of bus.

An embodiment of this disclosure further provides a computer-readable storage medium, configured to store computer software instructions that need to be executed by the foregoing processor, and the computer software instructions include a program that needs to be executed by the foregoing processor.

A person skilled in the art should understand that embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a compact disc (CD) ROM (CD-ROM), an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions may be alternatively stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to this disclosure without departing from the protection scope of this disclosure. This disclosure is intended to cover these modifications and variations of this disclosure provided that they fall within the scope of the claims of this disclosure and their equivalent technologies.

What is claimed is:

1. A Peripheral Component Interconnect Express (PCIe)-based data transmission method implemented by a first node, wherein the PCIe-based data transmission method comprises:

encapsulating first data into a transaction layer packet (TLP), wherein the TLP comprises a TLP header comprising a first field and a second field, wherein the first field indicates a data type of the first data is an image type, wherein the second field indicates at least one piece of parameter information comprising at least one of an image data type, pixel quantization depth, resolution, or segment indication information, wherein each of the first field and the second field comprises a reserved value, and wherein the reserved value is a status value that is not used; and sending the TLP to a second node, wherein the first node is either a first endpoint or a first switching node, and wherein the second node is either a second endpoint or a second switching node.

2. The PCIe-based data transmission method of claim 1, wherein the first field further indicates second parameter information corresponding to the data type, and wherein the second parameter information is not included in the at least one piece of parameter information.

3. The PCIe-based data transmission method of claim 1, wherein the first field is a type field in the TLP header.

4. The PCIe-based data transmission method of claim 1, wherein the second field further indicates identity information of a third node, and wherein the third node is a destination device of the TLP.

5. The PCIe-based data transmission method of claim 1, wherein the first node is the first endpoint, wherein the second node is the second endpoint, and wherein each of the first endpoint and the second endpoint is a peripheral device.

6. A Peripheral Component Interconnect Express (PCIe)-based data transmission apparatus implemented as a first node and comprising:

one or more processors configured to encapsulate first data into a transaction layer packet (TLP), wherein the TLP comprises a TLP header comprising a first field and a second field, wherein the first field indicates a data type of the first data is an image type, wherein the second field indicates at least one piece of parameter information comprising at least one of an image data type, pixel quantization depth, resolution, or segment indication information wherein each of the first field and the second field comprises a reserved value, and wherein the reserved value is a status value that is not used; and a transceiver coupled to the one or more processors and configured to send the TLP to a second node, wherein the first node is either a first endpoint or a first switching node, and wherein the second node is either a second endpoint or a second switching node.

7. The PCIe-based data transmission apparatus of claim 6, wherein the first field further indicates second parameter information corresponding to the data type, and wherein the second parameter information is not included in the at least one piece of parameter information.

8. The PCIe-based data transmission apparatus of claim 6, wherein the first field is a type field in the TLP header.

9. The PCIe-based data transmission apparatus of claim 6, wherein the second field further indicates identity information of a third node, and wherein the third node is a destination device of the TLP.

10. The PCIe-based data transmission apparatus of claim 6, wherein the first node is the first endpoint, wherein the second node is the second endpoint, and wherein each of the first endpoint and the second endpoint is a peripheral device.

11. A Peripheral Component Interconnect Express (PCIe)-based data transmission apparatus implemented as a second node and comprising:

a transceiver configured to:

receive, from a first node, a first transaction layer packet (TLP) comprising first data without sending the first TLP though a root complex; and send, to a third node, a second TLP comprising the first data without sending the second TLP though the root complex, wherein the first TLP or the second TLP comprises a TLP header comprising a first field and a second field, wherein the first field indicates a data type of the first data, wherein the data type comprises at least one of an image type, a video type, a control type, a security type, or a stream write (SWRITE) type, wherein the second field indicates at least one piece of parameter information corresponding to the data type, wherein the first node is either a first endpoint or a first switching node, wherein the second node is a second switching node, and wherein the third node is either a third endpoint or a third switching node.

12. The PCIe-based data transmission apparatus of claim 11, wherein the first field further indicates second parameter information corresponding to the data type.

13. The PCIe-based data transmission apparatus of claim 11, wherein the first field is a type field in the TLP header.

14. The PCIe-based data transmission apparatus of claim 11, wherein the first field comprises a reserved value.

15. The PCIe-based data transmission apparatus of claim 14, wherein the reserved value is a status value that is not used.

16. The PCIe-based data transmission apparatus of claim 11, wherein the second field further indicates identity information of the third node.

17. The PCIe-based data transmission apparatus of claim 16, further comprising a processor coupled to the transceiver and configured to determine a routing path based on the identity information of the third node, wherein the transceiver is further configured to send the second TLP to the third node based on the routing path.

18. The PCIe-based data transmission apparatus of claim 11, wherein when the data type is the image type, the at least one piece of parameter information comprises at least one of an image data type, pixel quantization depth, resolution, or segment indication information.

19. The PCIe-based data transmission apparatus of claim 11, wherein the third node is the third endpoint.

20. The PCIe-based data transmission apparatus of claim 11, wherein the first node is the first endpoint, wherein the third node is the third endpoint, and wherein each of the first endpoint and the third endpoint is a peripheral device.

* * * * *